(12) United States Patent
Logan et al.

(10) Patent No.: US 9,732,807 B1
(45) Date of Patent: Aug. 15, 2017

(54) CLUTCH ASSEMBLY AND SYSTEM

(71) Applicant: Logan Clutch Corporation, Westlake, OH (US)

(72) Inventors: W. Andrew Logan, Lakewood, OH (US); Scott W. Stevens, Columbia Station, OH (US); Michael S. Vining, Lakewood, OH (US); Robert S. Tekesky, North Olmsted, OH (US); Stefan Vinca, Westlake, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 174 days.

(21) Appl. No.: 14/731,513

(22) Filed: Jun. 5, 2015

Related U.S. Application Data

(60) Provisional application No. 62/008,621, filed on Jun. 6, 2014.

(51) Int. Cl.
| | |
|---|---|
| *F16D 35/00* | (2006.01) |
| *F16D 13/52* | (2006.01) |
| *F16D 48/02* | (2006.01) |
| *F16D 25/12* | (2006.01) |
| *F16D 25/0638* | (2006.01) |

(52) U.S. Cl.
CPC ........... *F16D 35/005* (2013.01); *F16D 13/52* (2013.01); *F16D 25/0638* (2013.01); *F16D 25/123* (2013.01); *F16D 25/14* (2013.01); *F16D 2300/18* (2013.01)

(58) Field of Classification Search
CPC .... F16D 25/06; F16D 25/063; F16D 25/0635; F16D 25/0638; F16D 25/064; F16D 25/123
See application file for complete search history.

(56) References Cited

U.S. PATENT DOCUMENTS

| | | | |
|---|---|---|---|
| 6,283,265 B1 * | 9/2001 | Hirayanagi | ........... F16D 25/123 192/113.36 |
| 2013/0172149 A1 * | 7/2013 | Mori | ...................... B63H 21/21 477/175 |

* cited by examiner

*Primary Examiner* — Jacob S Scott
(74) *Attorney, Agent, or Firm* — Ralph E. Jocke; Walker & Jocke

(57) ABSTRACT

Power transmission systems including clutch arrangements and systems are adapted to be used in marine and other environments. Such power transmission systems may include clutch arrangements that provide more effective power transmission capabilities as well as greater durability and longer life. Slipping clutch arrangements may effectively vary the output speed of a clutch arrangement from the speed of the engine or other driver as desired for the particular application. Various clutch arrangements also provide for greater flexibility and drive options, lighter weight, and diverse types of capabilities.

21 Claims, 23 Drawing Sheets

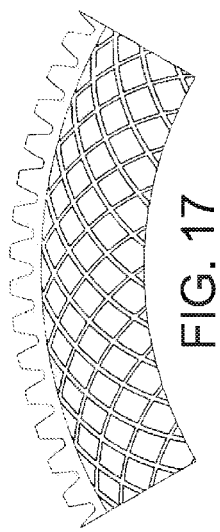
FIG. 14 SPIRADIAL GROOVING
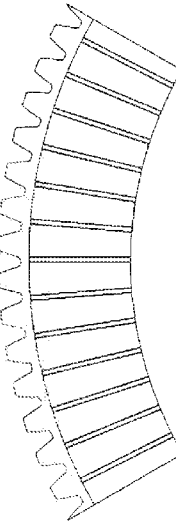
FIG. 15 SPIRAL GROOVING
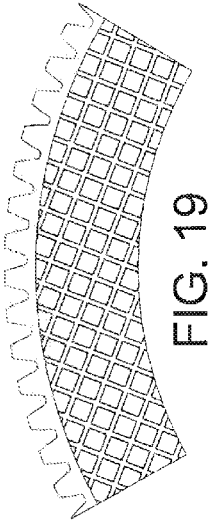
FIG. 16 ISOS (INSIDE-OUTSIDE SPIRAL) GROOVING
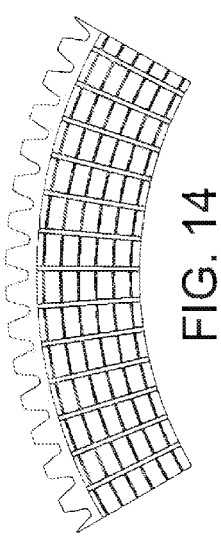
FIG. 17 DIFFERENTIAL (SUNBURST) GROOVING
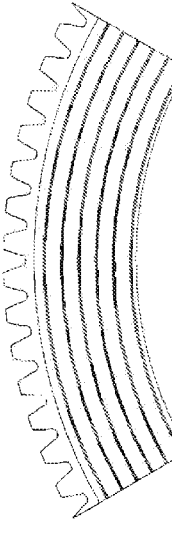
FIG. 18 RADIAL GROOVING
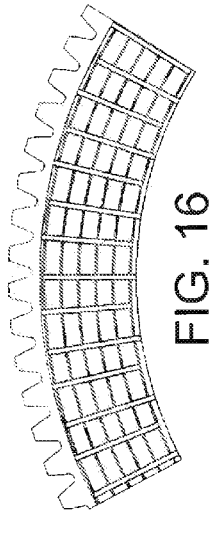
FIG. 19 WAFFLE GROOVING

CLUTCH ASSEMBLY AND SYSTEM

CROSS REFERENCE TO RELATED APPLICATION

This application claims benefit pursuant to 35 U.S.C. §119(e) of Provisional application Ser. No. 62/008,621 filed Jun. 6, 2014 the disclosure of which is incorporated herein by reference in its entirety.

TECHNICAL FIELD

This disclosure relates to mechanical power transmission systems. Particularly exemplary embodiments relate to clutch assemblies and systems in which clutch assemblies are used for selectively transmitting power.

BACKGROUND OF THE DISCLOSURE

Power transmission systems are used to selectively deliver rotational power from a driver device such as an internal combustion engine, electric motor or other source of rotational power, to a driven device. Driven devices may commonly include such things as pumps, electric generators, the tires of a vehicle or the propeller of a watercraft. Clutches are used to selectively operatively engage and disengage the driver from the driven device.

Mechanical clutches commonly operate to selectively engage and disengage the driver and driven devices by having a stack of adjacent clutch discs. The discs in the stack which is also referred to herein as a disc pack, are alternatively mechanically operatively engaged with driving and driven members. The axial force that acts between the discs can be selectively varied. When the clutch is not engaged, the discs that move with the driving member are sufficiently disposed from the discs that are engaged with the driven member such that they can rotate relative thereto. To engage the clutch, the discs in the stack are axially compressed such that the discs connected to the driving member are in pressurized abutting engagement with the discs connected to the driven member. As a result, the driven member is caused to rotate with the driving member, and the driven device is engaged with the driver.

High friction material is often attached to the discs to provide enhanced frictional engagement when the clutch is engaged. Releasing the axial compression force causes the discs to again be able to rotate relative to one another and the clutch is disengaged. Springs or similar mechanisms can be positioned between the discs to facilitate the discs sufficiently separating to disengage the clutch when the axial compression force is released.

Mechanical clutches commonly experience certain types of issues which limit their capabilities and useful life. These include wearing of the clutch discs over time with repeated engagement and disengagement of the clutch. Other issues may include providing sufficient axial force to the discs in order to transmit the level of power needed to operate the driven device. Other issues include avoiding excessive heat which can shorten the life of clutch discs and also limit power transmission capabilities. Other issues include shock and jarring which can damage driven devices when clutches are rapidly engaged. Other issues include damage to clutch components when the clutch is operated in a slipping mode for an extended period of time. Additional problems and drawbacks can be encountered with mechanical clutches and systems depending upon the particular system in which a clutch is used.

Mechanical clutches and related systems may benefit from improvements.

OBJECTS OF EXEMPLARY EMBODIMENTS

It is a further object of exemplary embodiments to provide an improved mechanical clutch.

It is a further object of exemplary embodiments to provide an improved mechanical clutch with greater power transmission capabilities.

It is a further object of exemplary embodiments to provide an improved mechanical clutch with longer life.

It is a further object of exemplary embodiments to provide an improved mechanical clutch for use in marine applications.

It is a further object of exemplary embodiments to provide an improved mechanical clutch that is more economical to operate.

It is a further object of exemplary embodiments to provide an improved mechanical clutch that is lighter in weight.

It is a further object of exemplary embodiments to provide an improved mechanical clutch that provides for controlled engagement.

It is a further object of exemplary embodiments to provide an improved mechanical clutch that can operate for extended periods in a slipping mode without adverse consequences.

It is a further object of exemplary embodiments to provide an improved mechanical clutch that can be used in hybrid drive systems.

It is a further object of exemplary embodiments to provide an improved mechanical clutch and system that can provide benefits in performance.

It is a further object of exemplary embodiments to provide an improved mechanical clutch and system that can be more readily serviced.

It is a further object of exemplary embodiments to provide methods of making improved mechanical clutches and systems.

It is a further object of exemplary embodiments to provide a method for repairing mechanical clutches.

Further objects of exemplary embodiments will be made apparent in the following Detailed Description of Exemplary Embodiments and the appended claims.

The foregoing objects are accomplished by the exemplary embodiments employing the principles described herein.

BRIEF DESCRIPTION OF DRAWINGS

FIGS. 14-19 show alternative types of grooving in clutch discs which may be used with the clutch shown in FIG. 9.

DETAILED DESCRIPTION OF EXEMPLARY EMBODIMENTS

It will be readily understood that features of exemplary embodiments may be arranged and designed in a wide variety of different configurations. Thus the following detailed description of the exemplary apparatus and method embodiments is not intended to limit the scope of the claims appended hereto, but are merely representative of selected exemplary embodiments that implement the principles described herein.

The features, structures and/or characteristics described herein may be combined in any suitable manner in one or more embodiments or arrangements. That is, a particular feature, structure or characteristic described in connection with one embodiment may be included in other embodiments or arrangements.

Figure 1:
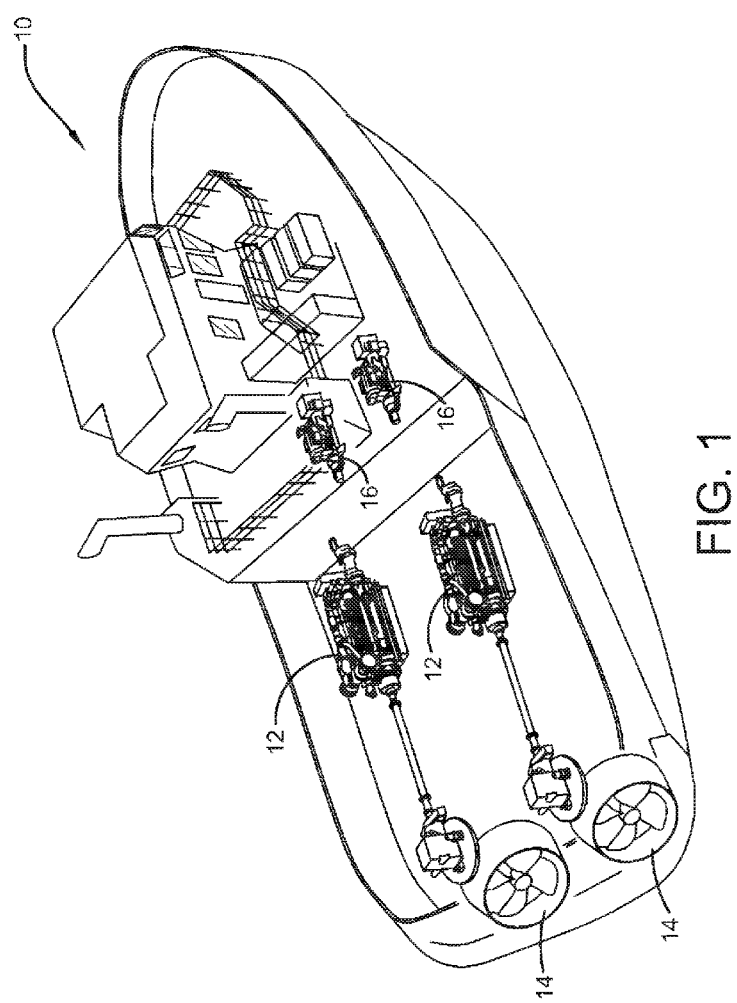
FIG. 1 is an isometric schematic view of a ship including clutch systems of some exemplary embodiments.

Referring now to the drawings and particularly to FIG. 1, there is shown therein an exemplary embodiment of a ship or other seagoing vessel generally indicated 10. The exemplary embodiment of the ship 10 as shown in this partially transparent view includes a pair of engines 12. Engines 12 drive respective azimuth thrusters 14. Thrusters 14 include propellers that are driven by the engines 12 to propel the ship 10.

The exemplary arrangement further includes a pair of electric generator sets 16. The generator sets include electrical generators powered by respective engines. The generator sets 16 are suitable for producing electricity used in the operation of the ship.

Figure 2:
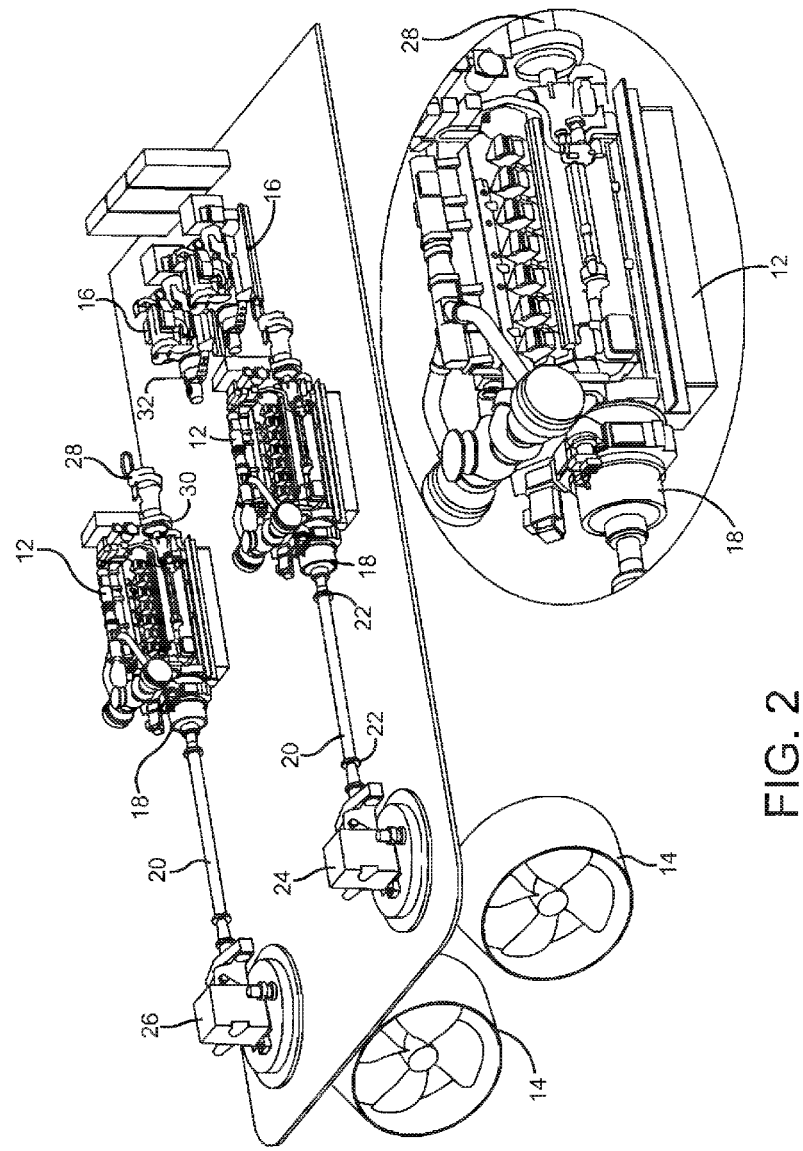
FIG. 2 is an isometric view including components of a drive system for a ship.

As shown in more detail in FIG. 2 engines 12 of the exemplary embodiment, each have attached thereto a mechanical clutch 18. Clutches 18 may be one of the types of clutches described herein. Each of the clutches is in operative connection with a drive shaft 20. Drive shaft 20 of the exemplary embodiment is a lightweight high strength shaft such as a carbon fiber shaft. Each shaft 20 is connected by couplings 22 to the clutch assembly 18 and the azimuth thrusters 14. Each of the azimuth thrusters is in connection with a gear box 24. Each gear box is in connection with a mechanical clutch 26.

In the exemplary arrangement each engine 12 has mounted on an end opposite to clutch 18, a firefighting pump 28. The firefighting pumps 28 are used to pump water such as may be used in a fire boat application to shoot water onto a fire. Each of the firefighting pumps 28 is driven through a respective clutch 30.

In the exemplary arrangement each of the generator sets 16 includes an engine such as a diesel engine which is connected to an electrical generator. The generator is operatively connected to the engine through clutches 32. It should be understood that in the exemplary embodiment each of the clutches may be selectively controlled to mechanically engage and disengage the driven device from the driving device. In some arrangements the clutches may be actuated by air. In such cases the clutches may be engaged and disengaged through the application of pneumatic pressure. Such pneumatic pressure may be applied and released through appropriate valves that change condition responsive to control circuitry. Alternatively in other arrangements the clutches may be engaged and disengaged via hydraulic pressure. Hydraulic pressure actuated clutches like those described hereafter are engaged and disengaged via the application and release of hydraulic pressure. The hydraulic pressure can be controlled through appropriate valves and circuitry. The particular type of clutch utilized depends on the particular application and the nature of the force and speed that need to be controlled. It should be understood that the clutches described herein are but examples of the numerous varieties of clutches that may be used in the applications discussed.

Figure 3:
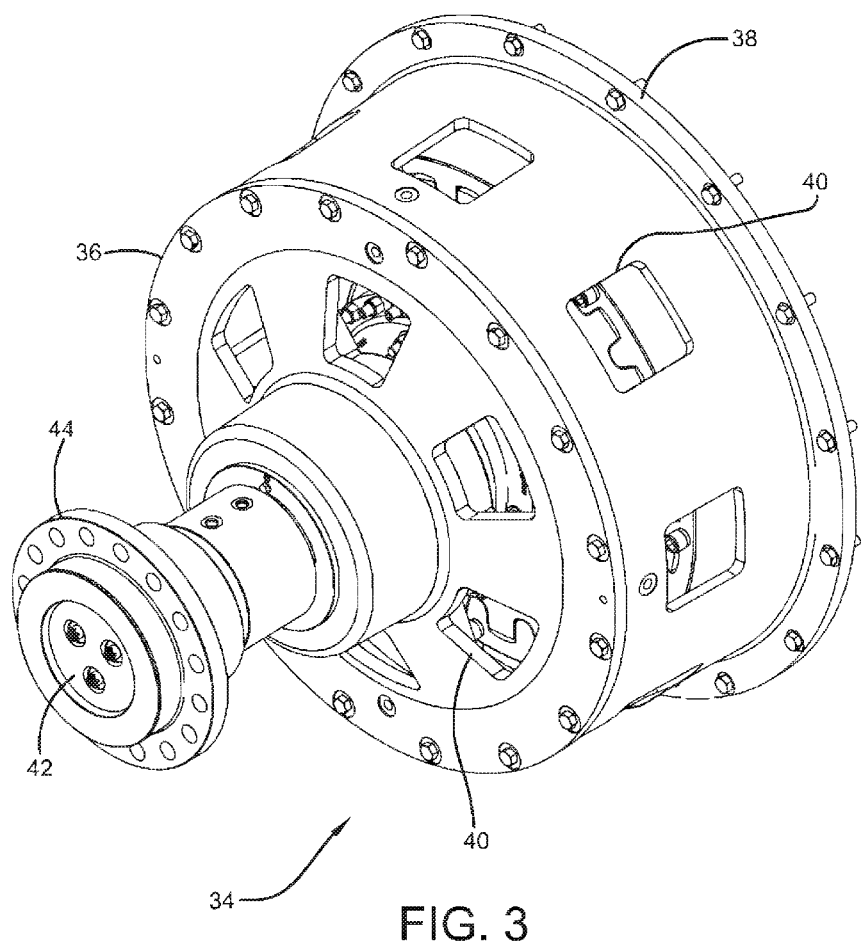
FIG. 3 is an isometric view of an exemplary clutch.

FIG. 3 shows an exemplary embodiment of a clutch 34. Clutch 34 is a hydraulic actuated clutch that may be used to selectively engage a driver such as an engine to a driven device such as a generator, propeller or a pump. The exemplary clutch 34 includes a housing 36. Housing 36 includes a mounting flange portion 38. Flange portion 38 includes openings through which fasteners may be extended as shown, to attach the housing 36 to a bell housing or other structure associated with a driver. The exemplary housing 36 includes a plurality of openings 40. Openings 40 extend in the annular and radially extending sides of the housing to facilitate cooling of clutch components within the interior of the housing.

Figure 4:
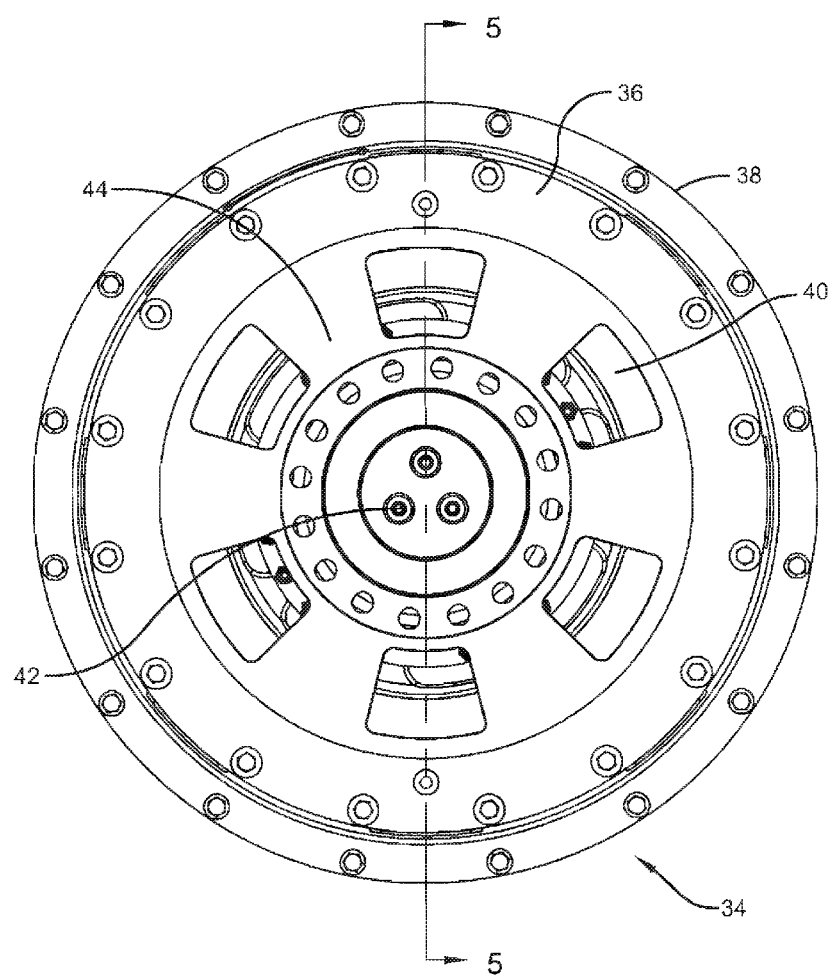
FIG. 4 is a rear view of the clutch shown in FIG. 3.

Clutch 34 includes a shaft 42 which has a coupling 44 thereon. Coupling 44 is mounted in fixed engagement with the shaft 42. As can be appreciated, FIGS. 3-5 only shows one half of the coupling arrangement which would couple the shaft 42 to a drive shaft or other suitable driven structure.

Figure 5:
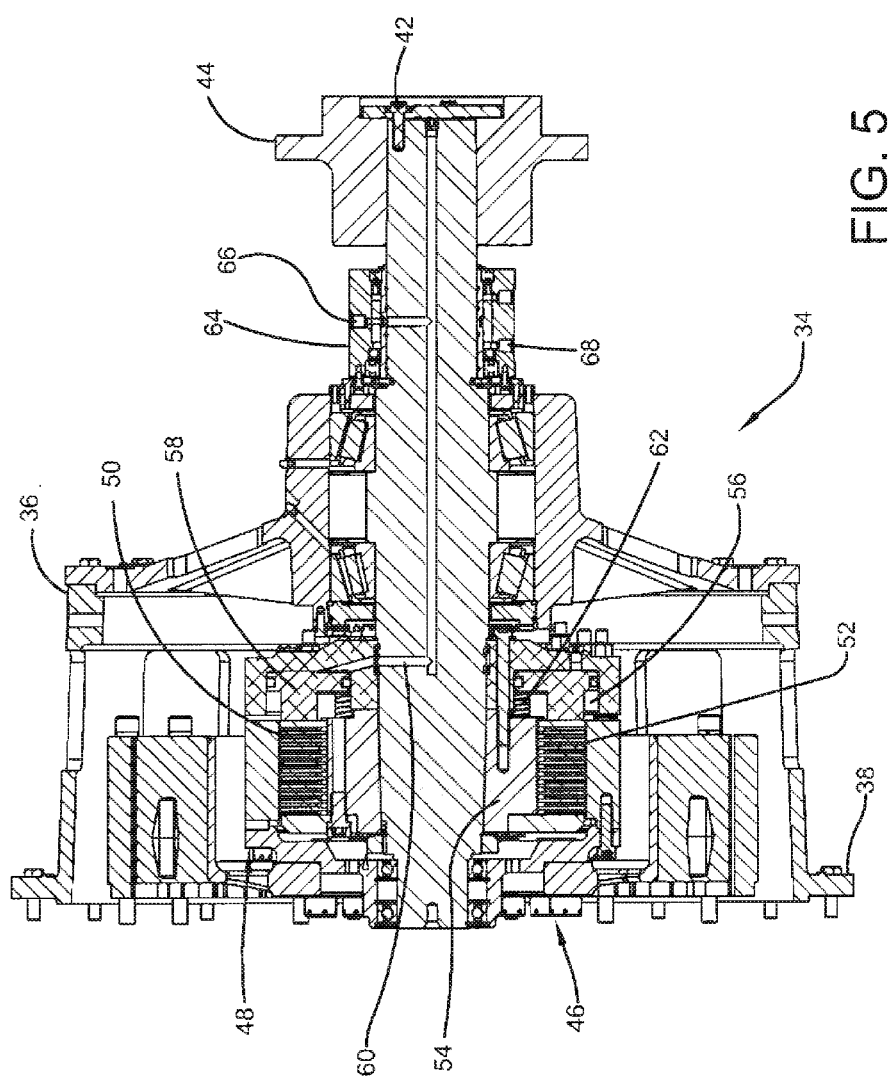
FIG. 5 is a cross-sectional view of the clutch taken along line 5-5 in FIG. 4.

As best shown in the cross-sectional view in FIG. 5, clutch 34 includes an input coupling 46. Coupling 46 couples to an engine or other member of a driver. Coupling 46 is in operative connection with a rotatable clutch disc housing 48. Clutch disc housing 48 is rotatable relative to the shaft 42 on bearings as shown.

A plurality of spaced clutch discs 50 are positioned in the clutch disc housing 48. In the exemplary embodiment the clutch discs have outer circumferential toothed edges that engage with correspondingly contoured grooves on the interior annular face of the disc housing 48. This arrangement enables the clutch discs 50 to move in the axial direction within the disc housing.

Intermediate of each adjacent pair of clutch discs within the disc housing is a separator disc 52. Each separator disc includes a toothed annular inside contour that engagingly conforms with a splined hub portion 54. Hub portion 54 is attached to the shaft and rotates therewith. The configuration of the splined hub and the toothed separator discs enables the separator discs to move in the axial direction on the splined hub.

In the exemplary embodiment the disc housing 48 includes therein a cavity 56. Cavity 56 is sized to enable axial movement of an annular piston 58 therein. Cavity 56 is operatively connected to a fluid passage 60. Hydraulic pressure applied to the fluid passage 60 causes the piston to move to the left as shown in FIG. 5. Movement of the piston to the left causes the clutch discs and separator discs to be axially compressed and moved relative to the disc housing and the hub portion. As the separator discs and clutch discs are compressed by the piston, the separator discs can no longer rotationally move relative to the clutch discs. This engages the clutch so that rotation of the coupling 46 causes the shaft 42 to rotate in coordination therewith.

As can be appreciated, relieving the hydraulic pressure from the cavity 56 causes the piston to no longer compress the discs and to retract to the right as shown in FIG. 5. The retraction of the piston is aided through the operation of springs 62. As the piston moves to the right, the force on the previously axially compressed friction discs and separator discs is relieved. This enables the friction discs and the separator discs to again rotationally move relative to one another. In such condition the clutch is disengaged. Of course it should be understood that this structure is exemplary and in other embodiments other approaches may be used.

As represented in FIG. 5, clutch 34 includes a clutch actuation fluid coupling 64. Clutch actuation fluid coupling 64 includes an opening 66 which is fluidly connected to a hydraulic line through a suitable fitting. Opening 66 remains stationary relative to the rotating shaft. The exemplary clutch actuation coupling 64 further includes a pair of outlet ports 68. Outlet ports 68 provide a drain to allow hydraulic fluid that is used to lubricate the clutch actuation coupling to drain out of the coupling structure.

Figure 6:
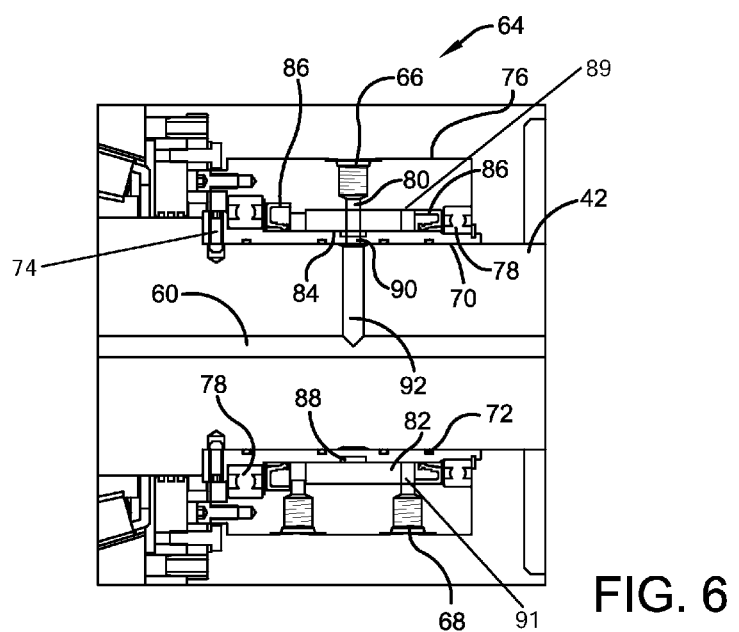
FIG. 6 is a partial cross-sectional view showing the rotational fluid coupling connection of the clutch shown in FIG. 5.
Figure 7:
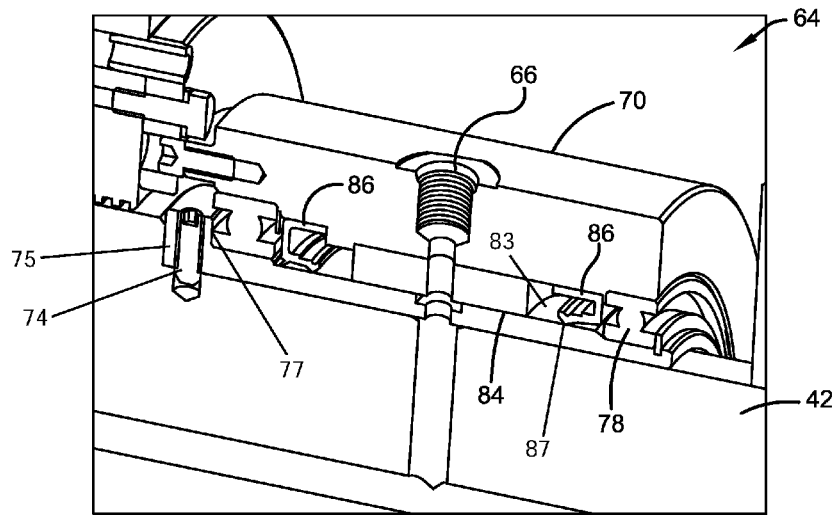
FIG. 7 is an enlarged cross-sectional view showing the actuation port of the fluid coupling shown in FIG. 6.
Figure 8:
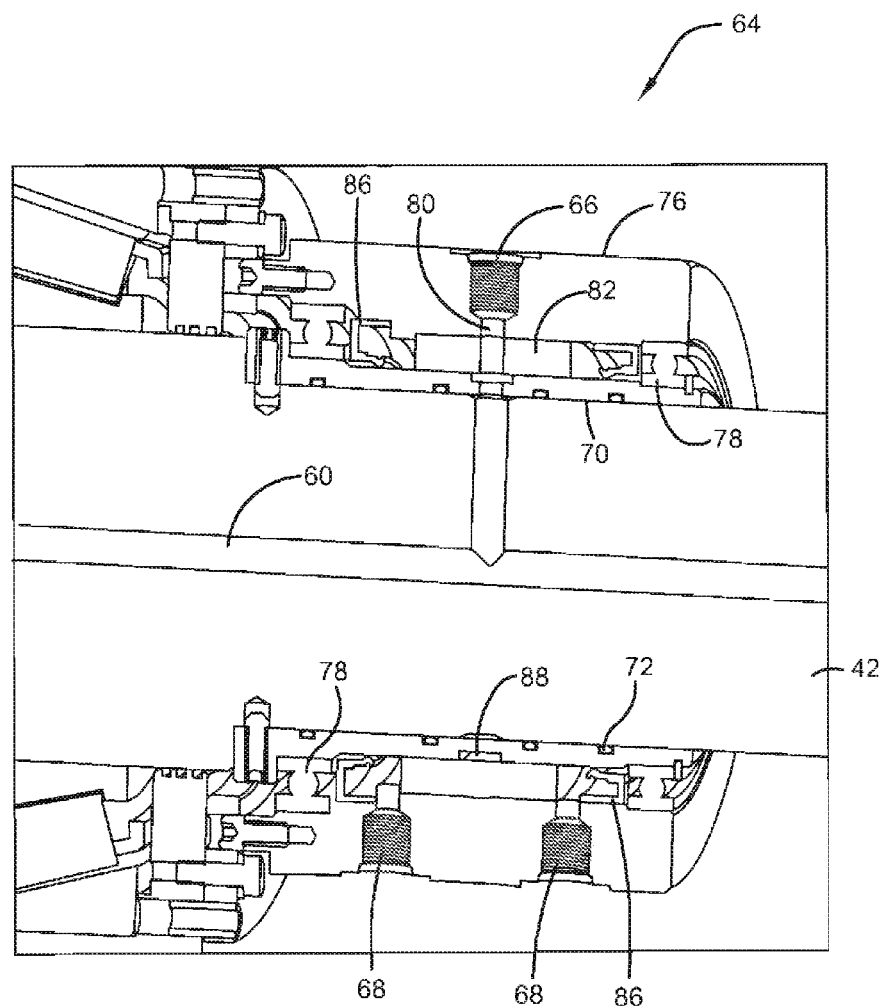
FIG. 8 is an enlarged cross-sectional view of the fluid coupling and flow passages of an exemplary arrangement.
Figure 9:
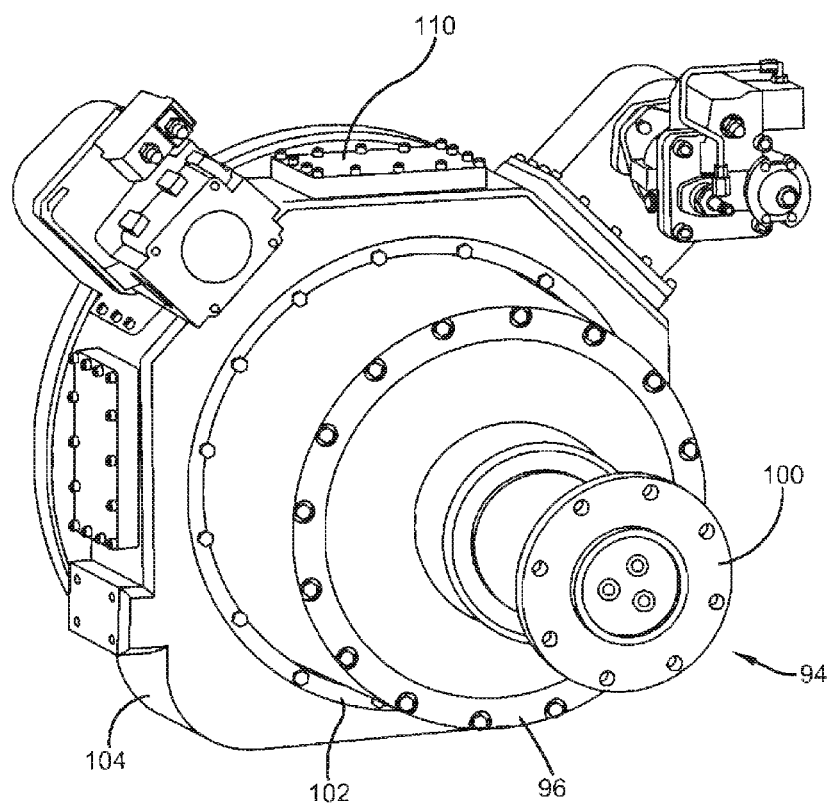
FIG. 9 is a rear isometric view of a further alternative embodiment of a clutch adapted to operate for extended periods in a slipping mode.
Figure 10:
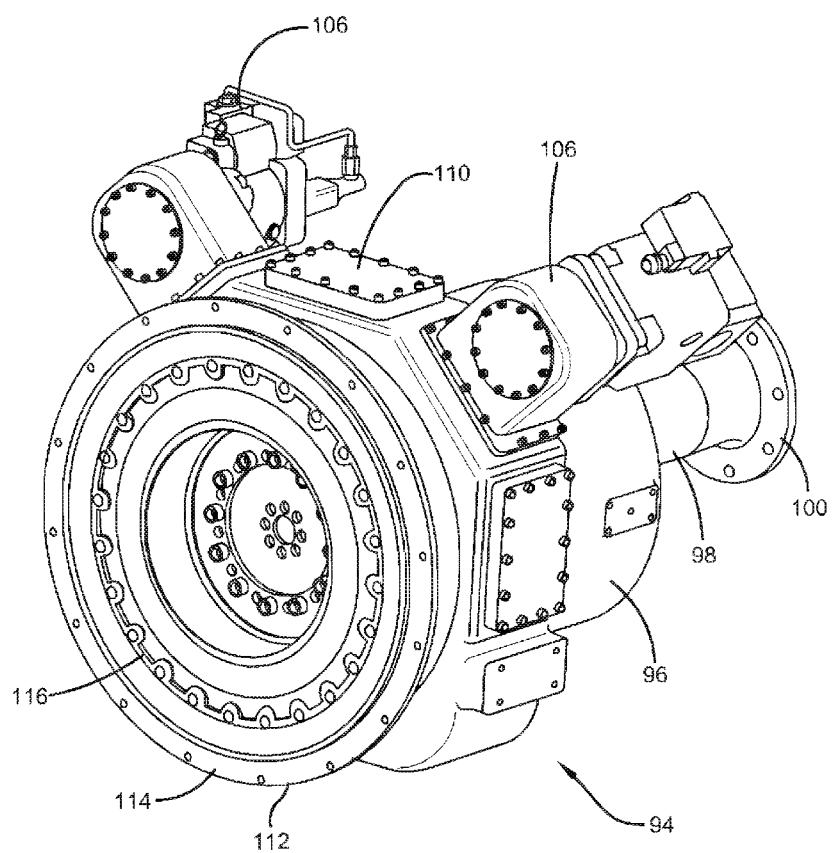
FIG. 10 is a front isometric view of the clutch shown in FIG. 9.
Figure 11:
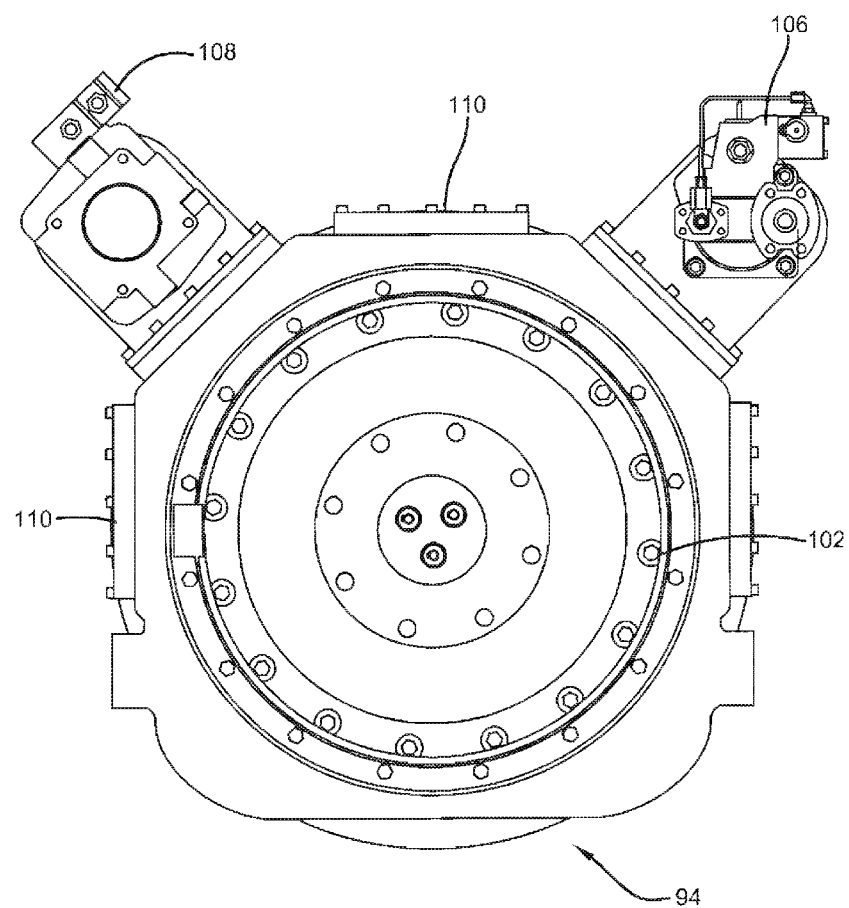
FIG. 11 is a front plan view of the clutch shown in FIG. 9.

The exemplary clutch actuation coupling is shown in more detail in FIGS. 6-8. The exemplary clutch actuation coupling includes an annular sleeve 70. Annular sleeve 70 overlies and extends in surrounding relation of the exterior surface of shaft 42 which is also referred to herein as a shaft outer face. Sleeve 70 is maintained in fluid tight engagement with the outer face of the shaft by annular resilient seals such as O rings 72 as shown. The sleeve 70 is held in relatively fixed rotational engagement with the shaft 42 through fasteners such as set screws 74. The set screws extend in an annular flange portion 75 of the sleeve.

The fluid openings 66 and 68 extend in an annular body 76. Annular body 76 extends in surrounding relation of the sleeve and is able to maintain its stationary rotational position because it is movably supported on the sleeve through a pair of disposed bearings 78. Flange portion 75 includes a radially extending step 77 and one of the bearings is positioned in adjacent relation with the step 77. Another bearing is positioned between a step on the sleeve and a locking ring as shown. A fluid passage 80 extends through the body 76. The fluid passage 80 extends generally radially between an outer face and an inner face of the body. A central block member 82 is in operative engagement with the body 76 at the annular inner face thereof. Block member 82 includes a fluid passage therethrough 84. The inner annular face of block member 82 of the exemplary embodiment is slightly radially disposed from the outer annular face 83 of annular sleeve member 70. This slight spacing is used to enable axial flow of hydraulic fluid for purposes of providing controlled lubrication flow as later discussed. However, it should be understood that in other embodiments the block member may have an inner annular face in abutting engagement with an outer annular face of the sleeve and the outer annular face of the block member may be radially disposed from the inner annular face of the body so as to enable axial liquid flow therebetween.

A pair of seals 86 are axially disposed on each side of block member 82. In the exemplary embodiment seals 86 are comprised of resilient material and provide a fluid tight seal at each end of the cavity of the body 76 in which the block member is positioned. Each of seals 76 in the exemplary embodiment is disposed in adjacent inboard relation to a bearing 78. Each of the exemplary seals is in operative attached engagement with the body. Each seal 86 includes a flexible inward extending annular lip 87. The annular lips are configured to be in contacting engagement with the relatively moving sleeve outer face 83. However, in other embodiments the seals may be configured to be in rotationally fixed operative engagement with the sleeve and the flexible lips or other sealing members configured to be in contact with an inner face of the body.

In the exemplary arrangement the passage 80 through the body 76 and passage 84 through the block member 82 are in fluid communication with an annular recess 88 that extends around the outer diameter of the sleeve member 70. The annular recess 88 is in fluid communication with a passage 90 through the sleeve member 70. Passage 90 is in fluid communication with a radially extending branch 92 of the fluid passage 60. Also as represented in FIGS. 7-8, resilient annular seals 72 extend annularly in sealing engagement between the inner face of the sleeve and the outer face of the shaft 72 on each axial side of the passage 90. As a result fluid leakage from the area of the passage 90 through the space between the sleeve and the shaft is prevented.

In operation, fluid used for actuating the clutch is provided through a fitting or similar connector through opening 66. The applied fluid pressure acts through the passage 80 in body 76 and through the passage 84 in block member 82 to reach the annular recess 88. The fluid pressure acting in the annular recess of the sleeve acts through the opening 90 in the sleeve such that fluid pressure is applied in branch 92 and fluid passage 60. Sufficient fluid pressure acting through the coupling engaged with opening 66 will move the piston to compress the clutch discs and separator discs so as to engage the clutch. Withdrawing the fluid pressure at opening 66 to a suitably low level causes the piston of the clutch and causes the clutch to retract and separator discs to disengage and become relatively rotationally movable.

A useful feature of the exemplary clutch actuation fluid coupling is that the inner annular face of the block member 82 is slightly disposed radially away from the outer annular surface of the sleeve member 70. This provides a small annular passage that provides controlled fluid flow in both axial directions from the passage 84 in the area between the block member and the sleeve. This fluid flow operates to cause the liquid hydraulic fluid to flow into contacting relation with the lips of the resilient seals 86 that are engaged with the outer face 83 of the sleeve. The fluid moves axially into cavities 89 that are bounded by the radially extending block side walls 91, the seals 86, the inner face of the body and sleeve outer face 83. The fluid reaching the resilient seal contact points serves to lubricate areas of engagement between the seal lips and the sleeve. Further the flow of fluid through the cavities 89 helps to provide a cooling effect as well as to remove any debris or other material that might otherwise be present within the cavities 89.

The fluid that passes between the block member 82 and the outer diameter of the sleeve 70 is drained from the cavity through outlet passages which are alternatively referred to as ports 68. Thus the exemplary arrangement can provide a generally continuous flow of lubricating and cooling fluid through the clutch actuation coupling so as to provide reliable operation and long life.

Further in the exemplary arrangement the coupling structures are fabricated to exact tolerances and have smooth polished finishes so as to provide precise locations and smooth engagement between the components of the clutch actuation coupling. The exemplary arrangement which provides for sealed engagement between the sleeve and the shaft avoids the need for the outer face of the shaft to be smooth and highly polished or perfectly symmetrical as any imperfections are accommodated by the plurality of annular seals 72 that extend between the inner face of the sleeve and the outer circumference of the shaft. Rather in the exemplary arrangement the flexible lips 87 contact the smoothed and polished outer face 83 of the sleeve which can provide reliable sealing and extended seal life. Further the exemplary arrangement includes seals that extend annularly on each axial side adjacent to passage 90 through the sleeve to the fluid passage 60 within the shaft. The positioning of these resilient annular seals prevents leakage of fluid between the sleeve and the shaft so as to provide reliable application of pressure to engage the clutch. Of course it should be understood that while the exemplary clutch actuation fluid coupling 64 has advantages, its features are exemplary and in other embodiments other or different structures or arrangements may be used.

FIGS. 9-13 show an alternative exemplary embodiment of a clutch 94. Clutch 94 of this exemplary embodiment is a slipping clutch meaning that it is designed to operate for extended periods with the driver and the driven device only partially engaged such that the driven device rotates at a speed that is different than the rotational speed of the driver. Clutch 94 may have particular applicability in marine applications such as in circumstances where it may be desirable to operate the propellers included in thrusters at a rotational speed that differs from the speed at which such propellers would rotate if the clutch were rigidly engaged with the driver. This approach might be useful, for example, when a marine engine is being operated to drive both a water pump for firefighting applications and the thrusters of the ship. In such circumstances it may be desirable to turn the water pump developing the water flow for use in fighting the fire at a very high rate of speed while the thrusters are only driven at a relatively low rate of speed as necessary for the ship to maintain the desired position relative to the object on which the water is being sprayed. Of course this is only one example of an application for the type of clutch 94.

The exemplary clutch 94 includes a housing 96. A shaft 98 extends from the housing and a coupling 100 is attached thereto. In the exemplary embodiment the clutch housing 96 is connected through a flange portion 102 to a gear housing which is alternatively referred to as a gear box 104. In the exemplary embodiment the gear box 104 houses suitable gears such as a ring gear, planetary gears or other suitable gear sets that include gears that can be engaged with gear driven devices through openings at multiple angularly spaced locations on the gear box. For example in the exemplary embodiment, the gear box 104 is shown operatively connected with a pair of gear driven pumps 106, 108. As can be seen from the figures, the exemplary embodiment of the gear box 104 includes five angularly spaced openings and mounting locations for accessory gear driven devices. For the device mounting locations where a device is not connected, the opening that can be used to access the gears located in the gear box can be covered by a removable cover plate 110.

In the exemplary embodiment, the gear box is in operative connection with a bell housing 112. The bell housing 112 includes a flange 114 or other suitable connecting portion that can be used to engage the bell housing with an engine or other suitable driving device. The exemplary bell housing houses a rotatable dampening coupling 116. Coupling 116 includes vibration reducing resilient materials and other suitable structures that reduce the propagation of undesirable vibrations and other forces from the engine or other driving members into the gear box and clutch. The coupling 116 of the exemplary embodiment is adapted to be engaged with a flywheel or other suitable rotating member of the engine or other driving member. Of course in other embodiments other types of couplings which can engage the clutch with driver or driven devices can be used.

Figure 12:
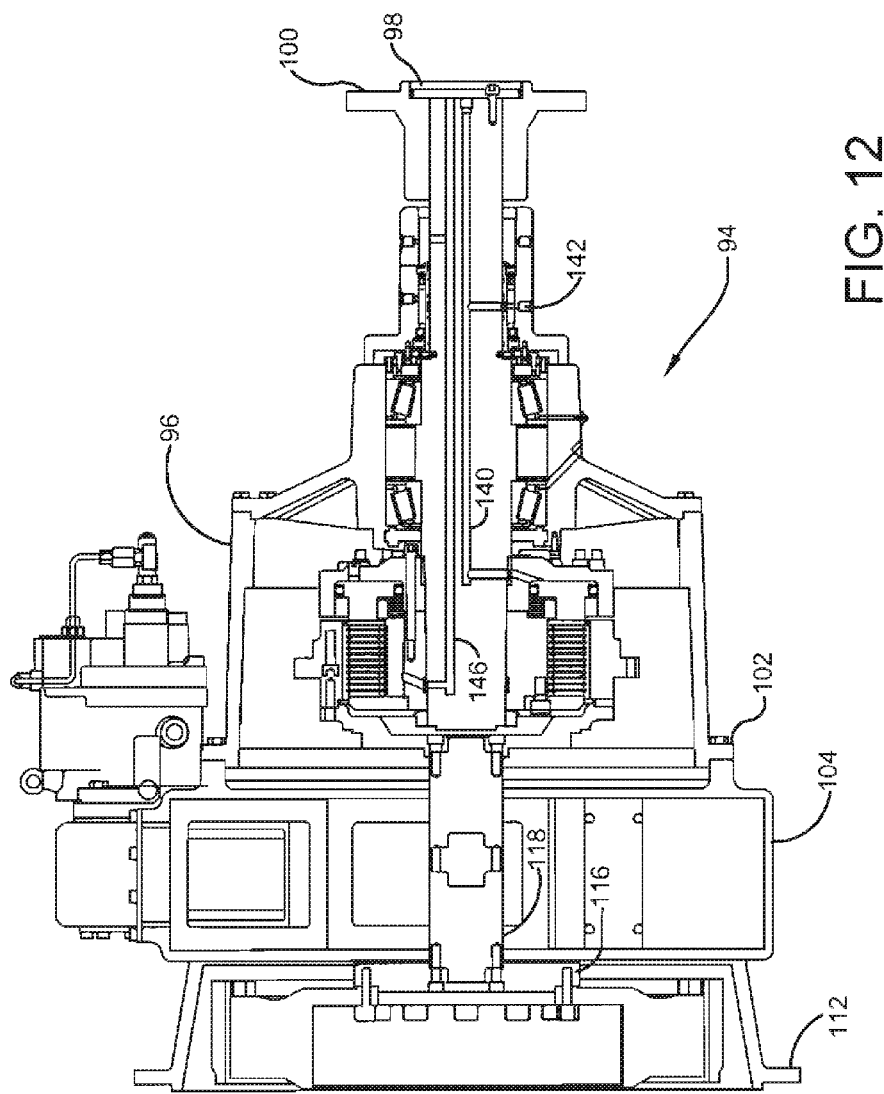
FIG. 12 is a cross-sectional view of the clutch shown in FIG. 9.
Figure 13:
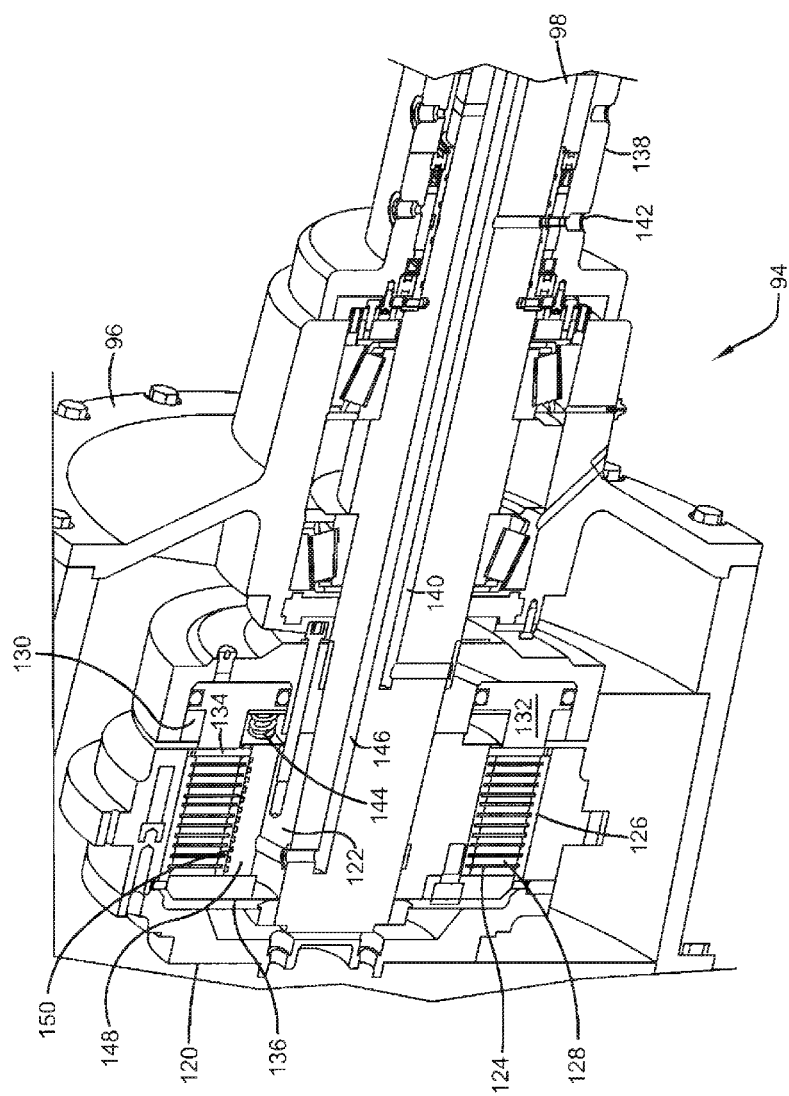
FIG. 13 is an enlarged cross-sectional view of the clutch shown in FIG. 10.

The exemplary slipping clutch 94 is shown in cross-section and in greater detail in FIGS. 12 and 13. In the exemplary arrangement the coupling 116 which is rotated by the engine and operatively connected to an input shaft 118 that extends in and operatively drives the devices of the gear box. The input shaft 118 is operatively connected to a generally cylindrical disc housing 120. Disc housing 120 is a generally cylindrical housing that houses clutch discs and separator discs of a disc pack which may be similar to those previously discussed. The shaft 98 extends in the disc housing 120 and is rotatable relative thereto when the clutch is disengaged.

As best shown in FIG. 13, a hub portion 122 is attached to shaft 98 and rotates therewith. Hub portion 122 includes an axially splined hub portion. The axially splined hub portion 122 is configured to rotationally engage and enable relative axial movement of a plurality of separator discs 124 thereon. The exemplary separator discs include an inner splined diameter that is configured to engage the splined portion of the hub. The disc housing includes an axially splined internal annular surface 126. Splined surface 126 is configured to rotationally engage the outer toothed contours of the outer splined diameter of a plurality of clutch discs 128. In the exemplary embodiment the clutch discs and separator discs are arranged in alternating relation with the clutch discs engaged through their outer splined diameter toothed contours with the annular inward splined surface of the disc housing, and the separator discs engaged through their inner splined diameter toothed contours with the splined hub portion.

In the exemplary arrangement the disc housing includes an annular cavity 130. Cavity 130 houses a movable annular piston 132 which is movable therein. An annular pressure plate 134 is positioned between the piston 132 and the disc pack comprising the clutch and separator discs. A backing plate 136 extends on the opposite side of the disc pack from the pressure plate 134.

As in the previously discussed embodiment, a clutch actuation fluid coupling 138 overlies the shaft 98 and is usable to supply fluid pressure to an actuator fluid passage 140. The clutch actuation fluid coupling 138 may include features similar to those discussed in connection with coupling 64.

Supplying pressure to the opening 142 is operative to cause fluid pressure to be applied behind the piston 132 in cavity 130. This causes the piston 132 to move axially to the left as shown in FIGS. 12 and 13. Movement of the piston correspondingly axially moves the pressure plate 134 and selectively moves the separator and clutch discs axially in the disc pack so as to engage the clutch. When fluid pressure is relieved from the fluid passage 140, springs 144 act to retract the piston 132 in the cavity. This enables the discs in the disc pack to axially move apart and to rotationally move relative to one another resulting in disengagement of the clutch.

The exemplary embodiment of slipping clutch 94 operates to maintain the clutch discs and separator discs in a fluid bathed environment. Liquid transmission fluid is passed radially outward between the discs of the disc pack in order to provide cooling and to carry away any debris that may be generated during clutch operation. Further in this exemplary embodiment because the clutch may be operated in a slipping mode for an extended period of time without damage, the liquid material extending on and between the discs operates to transmit rotational torque through fluid shear forces in circumstances where the clutch and separator discs are not contactingly engaged and/or are not fully compressively engaged.

In the exemplary arrangement the transmission fluid which passes through the disc pack is supplied by suitable fittings to a clutch fluid coupling. In some arrangements this may be a fluid coupling similar to the clutch actuation fluid coupling that was previously described in connection with supplying fluid for actuating the piston.

The transmission fluid that is alternatively referred to herein as cooling oil or cooling fluid, flows through a transmission passage 146 that extends in the shaft 98. The fluid passage is in connection with a manifold chamber 148 in the hub portion 122. The manifold chamber is connected to a plurality of fluid openings 150. The fluid openings 150 extend into the spaces between the grooves of the spline in the hub portion. This enables the transmission fluid to flow radially outward between the separator discs and clutch discs. In exemplary embodiments centrifugal force aids in moving the liquid in the outward direction.

In the exemplary arrangement the transmission fluid that flows between the discs moves radially outward away from the hub portion to the annular periphery of the disc housing 120 and splined annular surface 126. The transmission fluid that is moved radially outward passes through fluid outlet openings in the hub portion and drains into the generally fluid tight housing 96 of clutch 94. In the exemplary arrangement the oil is drained from the interior of the housing and is collected in a tank. From the tank the fluid can be returned by a pump to the transmission fluid passage of the clutch. As can be appreciated in some exemplary arrangements, the fluid circuit for the transmission fluid may include a heat exchanger or other suitable device to maintain the temperature of the fluid and the clutch within a desired operating range. In addition in some arrangements the fluid circuits may include suitable filters or other devices for removing debris or other impurities that may be entrained in the transmission fluid. Of course these approaches are exemplary and in other embodiments, other arrangements may be used.

FIGS. 14-19 show various forms of clutch discs which include arrangements of liquid holding grooves therein. In these exemplary embodiments the clutch discs are comprised of a metal disc with high friction material on each opposed axial side. As previously discussed, because in operation each clutch disc has an adjacent separator disc on each side, each surface including the high friction material is adjacent to and when the clutch is fully engaged, in compressed engagement against separator disc within the clutch disc pack.

FIGS. 14-19 show exemplary arrangements of grooves that may be included in friction material of exemplary clutch discs. As can be appreciated, the grooves in such discs provides fluid holding flow passages for the transmission fluid that passes radially outward through the disc pack. Further the grooves also provide passageways for the transmission fluid and enables flow even when the clutch discs and separator discs are being held in abutting engagement. In the exemplary embodiment, this facilitates the cooling flow of the transmission fluid through the disc pack. Further as can be appreciated in some exemplary arrangements, the orientation of the grooves in the friction material may facilitate the flow of transmission fluid radially outward through the grooves in response to centrifugal force created by the rotation of the disc pack. Exemplary grooves include radially extending grooves, circumferentially extending grooves and combinations thereof.

In the exemplary arrangement, the clutch may operate as a slipping clutch such that the speed of the engine or other driver device can be maintained at a much higher rate of rotational speed than the output shaft of the clutch and the driven device in operatively fixed rotational engagement therewith. In such arrangements, the fluid held entrained within the grooves may operate to transmit torque between the clutch discs and the separator discs based on the rotational movement of the fluid within the passages. This transmission of torque can be achieved based on the amount, flow and viscosity of the transmission fluid as well as the finish of the adjacent separator discs. Thus as can be appreciated, the rotational movement and torque of the engine may be at least partially transmitted through the disc pack via the fluid shear force of the rotating liquid. Further in some exemplary arrangements, the amount of the force transmitted may be selectively varied by movement of the piston to selectively vary the proximity of the clutch discs and separator discs in slip positions when the discs are not in direct contact. Thus for example having the fluid of the passages of the clutch discs in proximity to the separator discs will effectively transfer more rotational movement torque via fluid coupling effects in slip positions when the discs are in very close, non-contacting axial proximity than when the discs are disposed further axially apart.

As can be appreciated, these properties of enabling movement and force transmission when the clutch and separator discs are not in contacting engagement, can be useful in a number of different operating conditions. For example, in the exemplary arrangement shown in FIG. 2 where the engine drives not only the thrusters but also a firefighting pump, there will be circumstances where the full water flow through the firefighting pump is desirable. This may mean that the engine is operated at a relatively high rotational speed. However, the thrusters may only need to move at a relatively much slower rotational speed than would be achieved if the clutch were fully engaged. In these circumstances, selectively varying the axial distance between the discs included in the disc pack in a non-contact slip condition enables the exemplary clutch 94 to operate the thrusters at a selected much slower rotational speed than the rotational speed of the engine.

In addition, exemplary arrangements of the clutch may also provide the capability to avoid the shock and vibration that would otherwise arise upon full rigid contacting engagement of the clutch discs of a conventional clutch. For example in this exemplary arrangement rotational movement and force is being transmitted between the clutch discs and the separator discs as the discs move in closer proximity in response to axial movement of the piston and eventually engage in compressed contacting engagement. This enables the output shaft of the clutch to begin rotating at a relatively slow speed in slip positions of the piston and to then have the speed increase as desired to the level of the driver member as the discs increasingly contactingly and compressively engage. This "soft start" capability avoids unnecessary wear on clutch components as well as the devices that are driven through the clutch. Of course it should be understood that these approaches are exemplary and in other embodiments, other approaches may be used.

Figure 20:
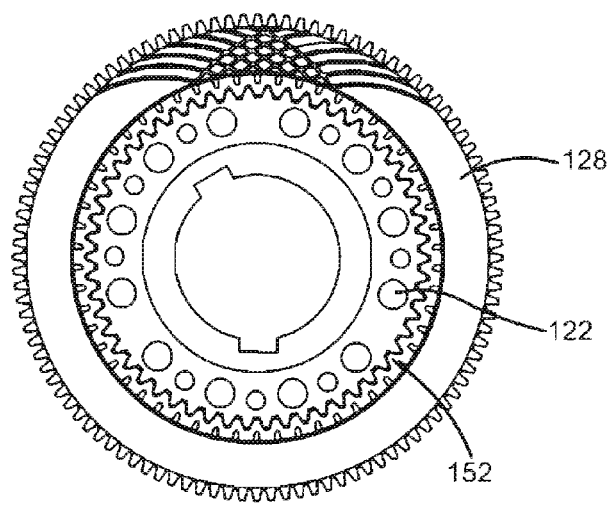
FIG. 20 is a plan view of a shaft, clutch disc and serrated Belleville spring for use in an exemplary clutch such as that shown in FIG. 9.
Figure 21:
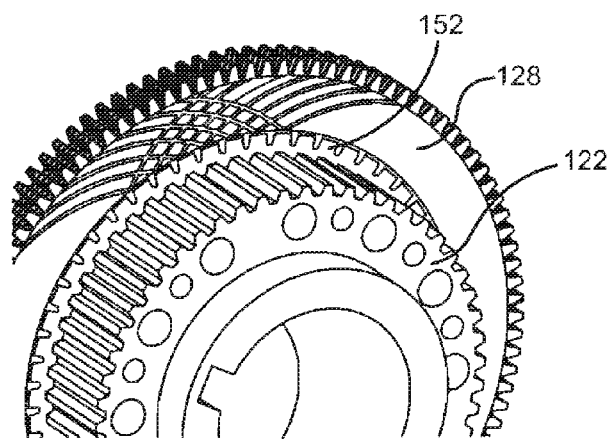
FIG. 21 is an isometric view of a hub, Belleville spring and clutch discs similar to that shown in FIG. 20.
Figure 22:
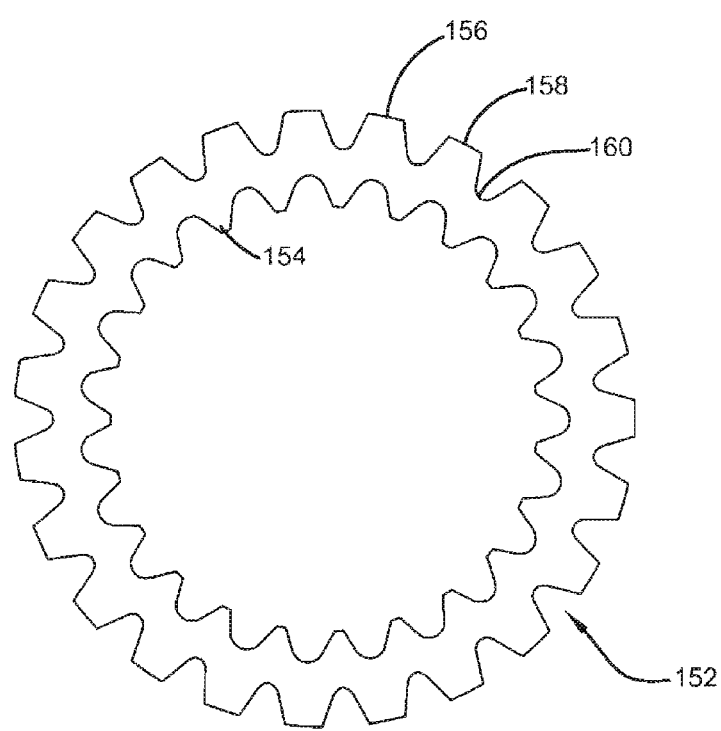
FIG. 22 is a plan view of an exemplary serrated Belleville spring.

In the exemplary embodiment of slipping clutch 94, the adjacent separator discs 124 and clutch discs 128 are biased away from one another by springs. In the exemplary arrangement the springs comprise serrated Belleville springs such as spring 152 shown in FIG. 22. The exemplary Belleville spring 152 includes a toothed serrated contour on its inner diameter 154 that conforms to the splined contour of hub portion 122. This contour enables the spring to move in the axial direction relative to the hub portion during actuation of the clutch and compression of the spring, while preventing rotational movement relative to the hub portion. This is shown in greater detail in FIGS. 20 and 21.

The exemplary serrated Belleville spring configuration 152 further includes an outer diameter having a serrated contour 156. The serrated contour includes projections 158 and recesses 160. The projections 158 provide the effect of fins for purposes of facilitating heat transfer. The recesses 160 provide for allowing fluid flow radially outward across the springs. The exemplary springs further include in cross section a consistent outwardly angled or canted contour in one direction.

Figure 23:
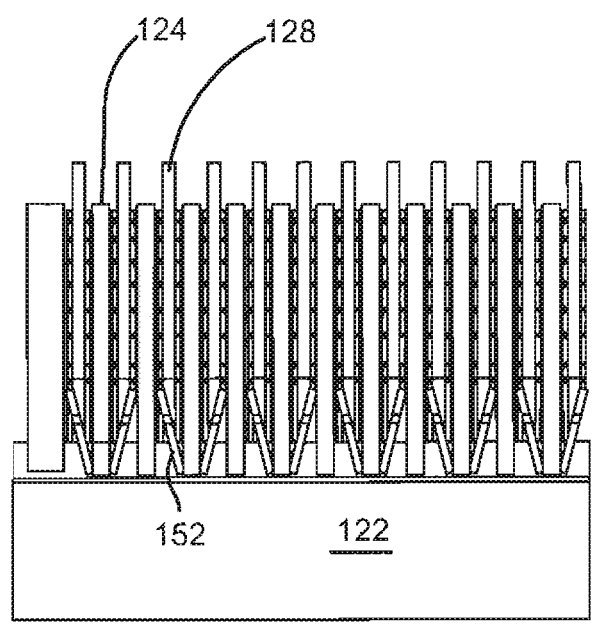
FIG. 23 is a side cross-sectional view of a plurality of clutch discs and separator discs where serrated Belleville springs extend intermediate of the separator discs.

FIG. 23 shows a cross-sectional view of the arrangement of springs 152, separator discs 124 and clutch discs 128 of an exemplary embodiment. As shown in the exemplary arrangement, the springs 152 are arranged in sequentially opposite canted directions in the disc pack. This approach is used to provide more balanced separating forces applied by the springs to the adjacent separator discs. Thus as can be appreciated from FIG. 23, the exemplary arrangement operates to maintain clutch discs and separator discs spaced apart in the disengaged condition of the clutch. However, with movement of the piston 132 to engage the clutch, the force of the piston overcomes the force of the springs 152 to cause the clutch discs and separator discs to move closer together. As this happens, the transmitted rotational torque initially due to shear forces of the liquid causes increased fluid coupling effects and rotational and torque transmission while the discs "slip" relative to one another. Bringing the discs into closer proximity through selective movement of the piston in slip positions increases the amount of torque that is transmitted solely by fluid effects. The transmission of rotational movement is increased as the clutch discs and separator discs begin to contact and press against one another. The torque of the engine is fully transmitted when the piston has compressed the discs in engaged relation to the maximum extent and the clutch and separator discs are rotating in unison. Of course it should be understood that these approaches are exemplary and in other embodiments other arrangements may be used. Further it should be understood that while in the exemplary embodiment the driver device is in fixed operative rotational connection with the disc housing and the driven device is in fixed operative rotational connection with the shaft, in other clutch arrangements the relationships may be reversed.

Figure 24:
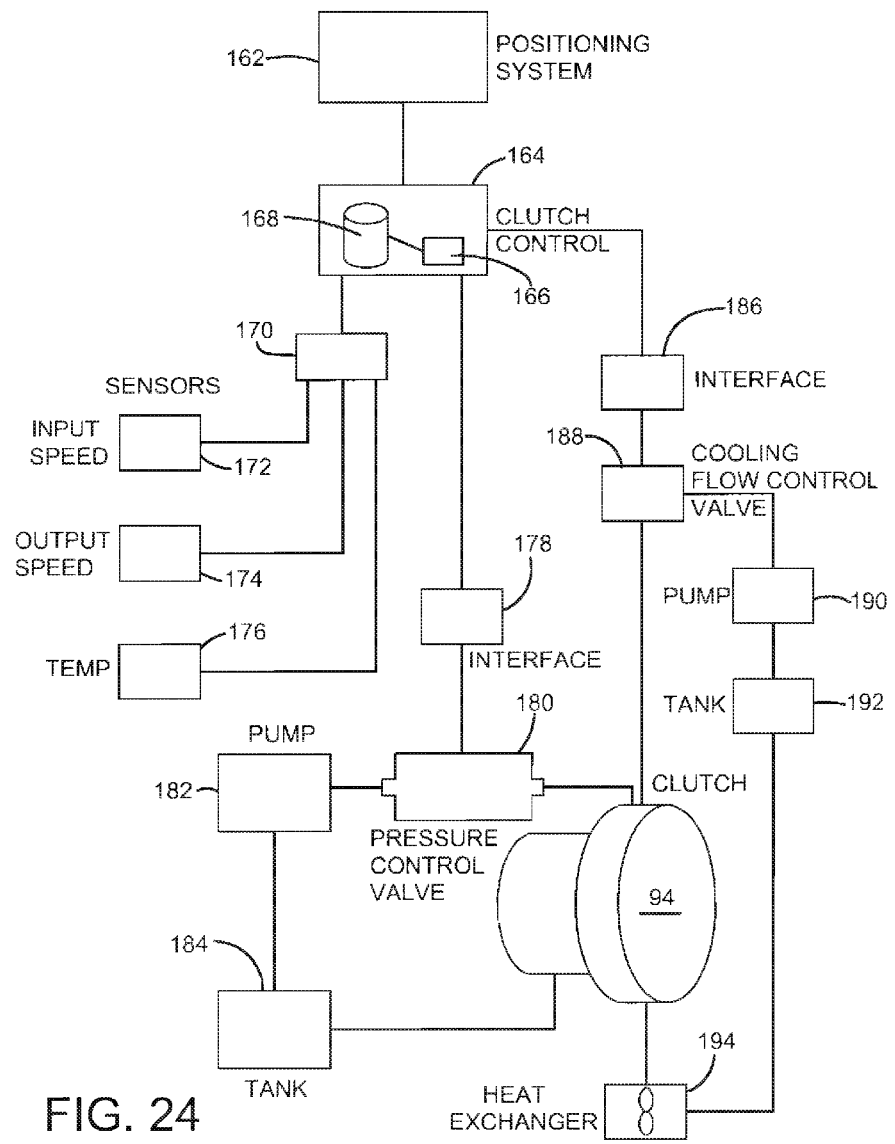
FIG. 24 is a schematic view of an exemplary control system for a slipping clutch.

FIG. 24 shows schematically an exemplary control system that is used to control the operation of a slipping clutch such as clutch 94. As previously discussed, the slipping clutch may be particularly useful in applications where the driver device advantageously operates at a higher speed and at least one driven device operates at a substantially lower speed. One exemplary application of this type is in the ship example previously discussed where the engine advantageously operates a water pump for pumping firefighting water at a high speed while the thrusters are operated by the engine at a much lower speed as a result of slipping of the clutch. Of course this is only one of many such applications where approaches of this type are advantageously used.

In the ship used for firefighting example, the ship will commonly be equipped with a GPS positioning system such as the one schematically indicated 162 in FIG. 24. Such a positioning system may communicate with GPS satellites to determine the position of the ship. Further in the exemplary arrangement the positioning system may operate to resolve the commands necessary to control the ship's thrusters in order for the ship to hold a particular position despite the effects of wind, waves, fire nozzle thrust and other things that may be acting to try to move the ship. As can be appreciated, the exemplary positioning system includes control circuitry including processors, data stores with computer executable instructions and other appropriate electronic components. The system determines the desired position to be held and resolves the necessary messages to be issued to the different electronically controlled components of the ship so as to accomplish holding the ship in the desired position. Of course it should be understood that this may be but one function of such a positioning system, and many other functions may be capable of being carried out depending on the nature of the positioning system and its programming.

As represented in FIG. 24, the positioning system is operatively connected to clutch control circuitry 164. The exemplary control circuitry may include one or more of a microprocessor, CPU, FPGA, ASIC or other type of circuit that is capable of executing instructions. The data store may include one or more of a volatile or nonvolatile memory device or medium including RAM, CD, DVD, flash memory, hard drive, solid state drive, magnetic memory, optical storage memory or other medium which data and/or machine executable instructions can be stored. The clutch control circuitry of the exemplary embodiment includes one or more microprocessors 166. The clutch control circuitry also includes one or more data stores 168. Data stores 168 may be any one of the different types of media suitable for storing thereon computer executable instructions and computer readable data. Such data stores in exemplary embodiments may include, for example, hard drives, solid state memories, programmable read-only memories, random access memory or other similar computer readable media.

In the exemplary embodiment the clutch control circuitry is connected through one or more interfaces 170 with sensing devices schematically represented 172, 174 and 176. In the exemplary arrangement sensor 172 is operative to sense the input speed of the slipping clutch. This may be done by determining the rotational speed of the engine. Alternatively this may be accomplished by sensing the rotational speed of one or more components in the gear box or other mechanism that rotates at a speed that corresponds to the speed of the engine.

Sensing device 174 senses the output speed of a component that corresponds to output speed of the shaft of the clutch. The output speed sensor may include a sensor that senses one or more elements on the output shaft. Alternatively it can sense elements moving on or with couplings, drive shafts or other suitable components whose speed corresponds to the speed of the clutch shaft.

Sensor 176 comprises one or more temperature sensors. This temperature sensor may be operative to sense the temperature of one or more different components or items associated with the clutch. For example, the temperature sensor may sense the external or internal housing temperature. Alternatively or in addition, sensors may sense the temperature of the transmission fluid/cooling oil in or after leaving the housing. Other sensors may sense the temperature of transmission fluid/cooling oil that is entering the clutch housing. Alternatively other sensors may sense the temperature at the surface of clutch discs or other components. Numerous different types of sensors may be used for such purposes.

It should be understood that the sensing devices discussed are exemplary and in other arrangements different, additional or other types of sensors may be included to sense parameters that are desirably sensed for purposes of controlling the slipping clutch.

The exemplary clutch control circuitry is further in operative connection with an interface 178. Interface 178 is in operative connection with a pressure control valve 180. The pressure control valve 180 is a hydraulic control valve. In the exemplary embodiment valve 180 operates to control the fluid pressure that is applied in the actuator fluid passage to move the piston 132 so as to relatively axially position the clutch and separator discs. Valve 180 is operative to control hydraulic fluid pressure supplied by a pump 182 that is applied to the actuator fluid passage 140 which controls movement of the piston within the clutch 94. Pump 182 is supplied with hydraulic fluid from a tank 184. Tank 184 receives hydraulic fluid from the drain ports of the fluid coupling which is in connection with the shaft of the clutch. Of course it should be understood that this fluid circuit is exemplary and in other embodiments other approaches may be used.

The clutch control circuitry 164 is also in operative connection with an interface 186. Interface 186 is in operative connection with a cooling flow control valve 188. Valve 188 controls the flow rate of transmission fluid through the transmission fluid passage and the disc pack of the clutch. Flow control valve 188 is supplied with transmission fluid by a pump 190. Pump 190 is supplied with fluid from a holding tank 192. Holding tank 192 is supplied with liquid that is drained from the clutch housing. Further as shown in this exemplary fluid circuit, a heat exchanger 194 may be included in the fluid circuit to cool and maintain the temperature of the transmission fluid/cooling oil in a temperature range that provides for efficient operation of the clutch and which minimizes wear on the clutch components.

In the exemplary arrangement the positioning system is operated to hold the position of the ship and communicates with the clutch control circuitry to operate the thrusters at the speed necessary to hold the ship at the desired position. Of course it should be understood that while the system shown in FIG. 24 operates to control the speed of the output shaft of the clutch and thus the speed of the associated thrusters, the positioning system of an exemplary embodiment would also be in communication with appropriate circuitry and control systems that control the direction in which the thrusters are pointed.

The control circuitry 164 responds to the electrical commands of positioning system 162 to speed up or slow down the output shaft of the clutch so as to cause the thrusters to operate at the speed necessary to hold the desired position. In doing this, the clutch control circuitry uses the information from the sensors to monitor input speed, the output speed and the temperature and other parameters associated with the clutch. The control circuitry then operates to send signals which control the pressure control valve as desired to change the output speed of the clutch. In addition in the exemplary arrangement the clutch control also operates to control the rate of transmission fluid/cooling oil through the clutch so as to maintain the temperature of the clutch at the desired level for purposes of allowing the clutch to slip while still providing the desired degree of torque transmission.

Further in some exemplary arrangements the control circuitry may operate to cease cooling the transmission fluid and/or control or stop the flow of transmission fluid under appropriate conditions by controlling one or more transmission fluid handling components. For example, in circumstances in which slipping or partial engagement of the clutch causes high heat generation, the control circuitry may operate in accordance with its programming to send control signals through appropriate interfaces to cause the heat exchanger fan or other cooling device to operate at maximum cooling capability. In addition the control circuitry may cause the pump and cooling flow control valve to operate at high flow. If the clutch condition is changed so it is fully engaged (or alternatively fully disengaged) the amount of heat generated by the clutch is reduced. In response to sensing the lower temperature the exemplary control circuitry may operate in accordance with its programming to reduce the speed or stop the fan or other cooling device associated with the heat exchanger. Alternatively or in addition, the control circuitry may cause the pump to operate at a slower speed and/or change the condition of the flow control valve to provide less flow of transmission fluid through the clutch. Upon further cooling of the clutch the exemplary control circuitry may operate to shut off the heat exchanger cooling device, the pump and/or the valve. Taking such actions when cooling is not needed can be done to save energy and to reduce operating time and wear of the fluid handling components. Of course these approaches are exemplary and other control systems may control clutch temperature via different methods of operation.

Of course as can be appreciated, if the positioning system senses that the ship is moving away from the desired position despite the current speed of rotation of the associated thruster, the positioning system will cause the clutch control circuitry to increase the speed of the output shaft of the clutch. Likewise if the positioning system determines that the thrusters are providing more thrust than is necessary to hold the ship in the desired position, the positioning system will send signals which cause the control circuitry to provide greater slipping of the clutch and thus lower the speed of rotation to the associated azimuth thruster. Of course it should be understood that the control system is exemplary and the description is simplified, and in other arrangements, other approaches may be used.

An advantage of the exemplary slipping clutch and ship drive control system of the exemplary embodiment is that it can avoid the need for additional equipment that would otherwise be needed to accomplish the same function. The exemplary system can also accomplish the slipping and control functions more effectively than other approaches. Specifically some arrangements may include an intermediate transmission device between the engine and the thruster. Such an intermediate device often adds considerably more weight to the drive system for the ship, which can be undesirable. In addition, such intermediate transmission devices consume energy which can lower efficiencies. A further issue that is sometimes encountered is that the use of such an intermediate device can result in additional drive shafts and driven shafts as well as universal joints to connect the intermediate device to the driving and driven members. Such additional shafts and universal joints also can lower efficiencies. These disadvantages can be reduced through the use of the exemplary clutches and systems that have been described.

Figure 25:
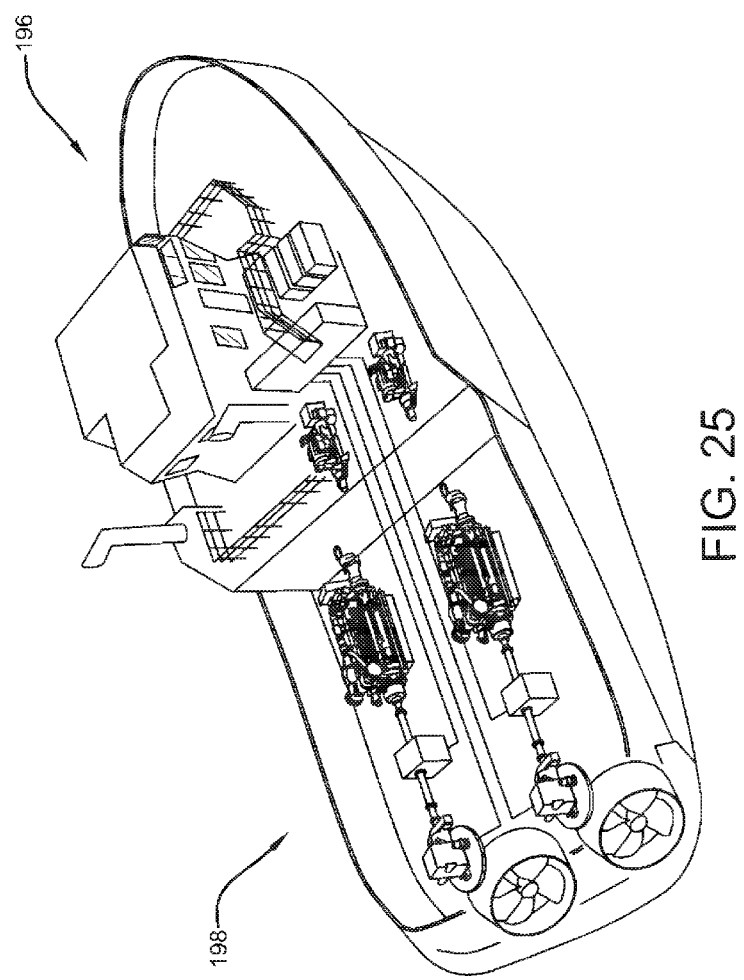
FIG. 25 is a schematic view of a ship including an exemplary hybrid drive system.

FIG. 25 shows a schematic transparent view of a ship 196. Ship 196 includes a diesel electric hybrid drive system generally indicated 198. The exemplary hybrid drive system is shown in greater detail in FIG. 26. The hybrid drive system includes azimuth thrusters 200 which may be similar to those previously described Like the previously described thrusters, the angle of the thrusters is selectively controllable. Each of the thrusters are driven through a respective gear box 202. The gear box 202 is driven through a clutch 204.

Each thruster gear box is operatively connected to a motor generator 206. Each motor generator is connected through a shaft to an engine 208 such as a diesel engine. The engine 208 is operatively connected to the motor generator through a clutch 210. In this exemplary arrangement, clutch 210 may be similar to clutch 34 previously described. Clutch 210 in the exemplary embodiment generally is not a slipping clutch. However, it should be understood that in other arrangements slipping clutches or other types of clutches may be used.

Figure 26:
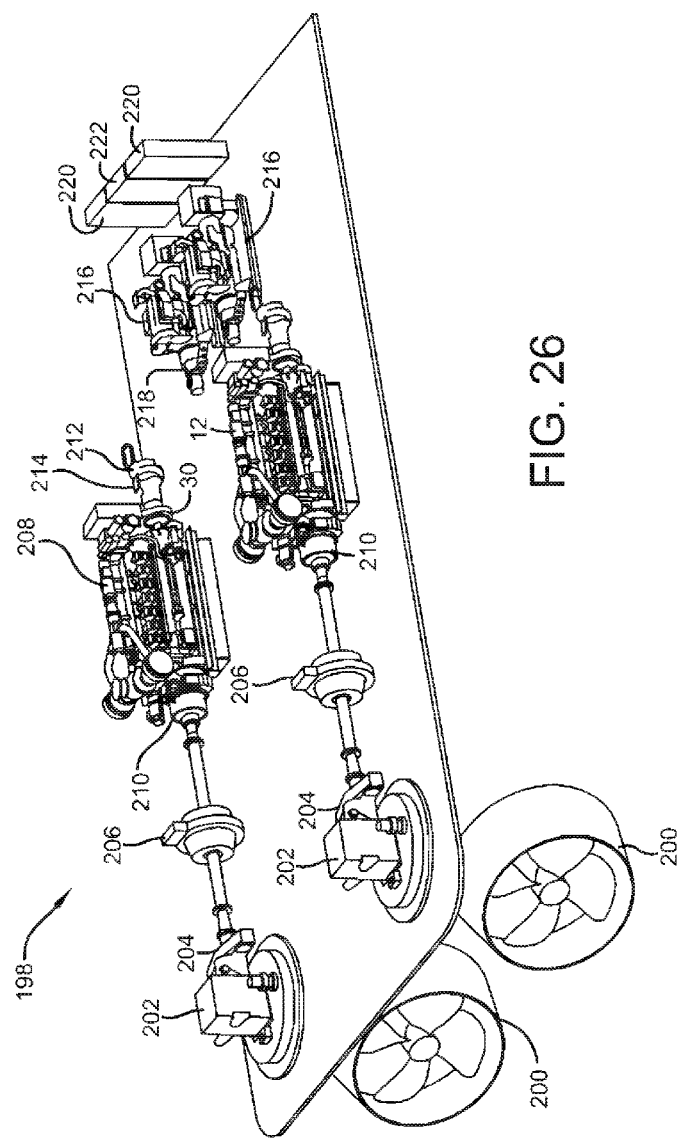
FIG. 26 is an exemplary schematic view of an engine room including a hybrid drive system.

As further represented in FIG. 26, each of the diesel engines 208 is operative to drive a firefighting pump 212. Each of the firefighting pumps are operatively connected to the engine through a respective clutch 214.

The exemplary arrangement further includes generator sets 216. Each generator set 216 includes a diesel engine and an electric generator. Each electric generator is in operative connection with the engine through a clutch 218. The exemplary system further includes battery packs 220 as well as control circuitry 222. Of course it should be understood that these components of the hybrid drive system 198 are exemplary and in other arrangements, different, other or additional components may also be included.

In operation, the hybrid drive system may operate in a number of different modes. For example in one mode of operation, a diesel engines 208 may drive an azimuth thruster by engaging clutches 210 and 204. In such circumstances the intermediate motor generator 208 may be freewheeling. Alternatively in other circumstances the motor generator may be loaded so as to generate electricity from the rotation provided by the diesel engine 208.

In an alternative mode of operation, a thruster may be driven through operation of a motor generator 206. In these circumstances clutch 210 may be disengaged while clutch 204 on the azimuth thruster may be engaged. In this condition the motor generator which is supplied with power either from the generator sets 216 or from the batteries 220 may operate to power the thruster.

In still another arrangement which is similar, the clutch 214 which drives the firefighting pump 212 could be engaged while clutch 210 is disengaged and the thruster is driven by the motor generator 206. In this condition, the firefighting pump capacity is controlled by the speed of the engine 208 while the speed of the azimuth thruster is controlled by the speed of the motor generator. This can provide for totally independent and different speeds for the firefighting pump and the azimuth thruster without the need for a slipping clutch.

In still another alternative arrangement of the system shown, the clutch 204 on the azimuth thruster may be disengaged while clutch 210 which connects the engine 208 and the motor generator 206 is engaged. In this condition the engine 208 can be used to drive the motor generator so as to produce electricity.

As can be appreciated, this exemplary hybrid drive system arrangement provides many different optional operating configurations which can be used to best serve the particular functions that are needed for a given ship condition or other operating environment. Of course as can be appreciated the approaches described are exemplary and in other embodiments, other approaches may be used.

Figure 27:
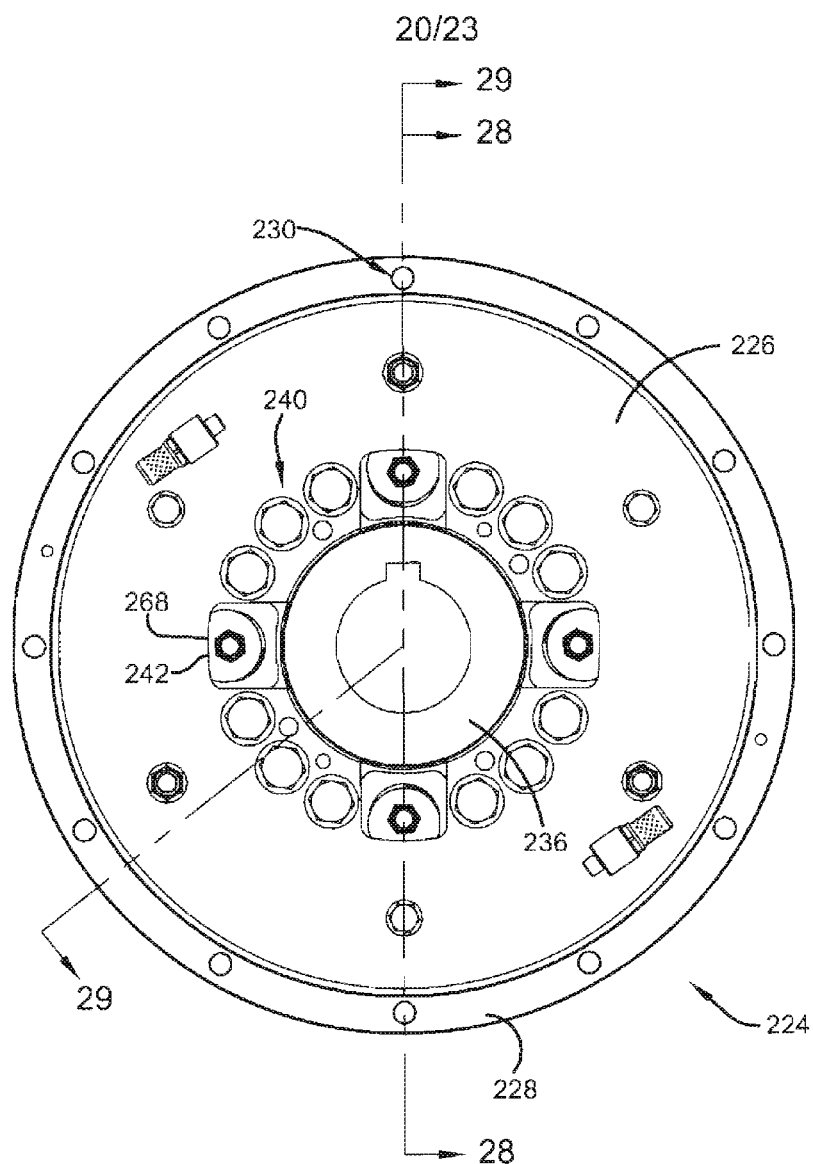
FIG. 27 is a rear plan view of an air-cooled clutch of an alternative exemplary embodiment.
Figure 28:
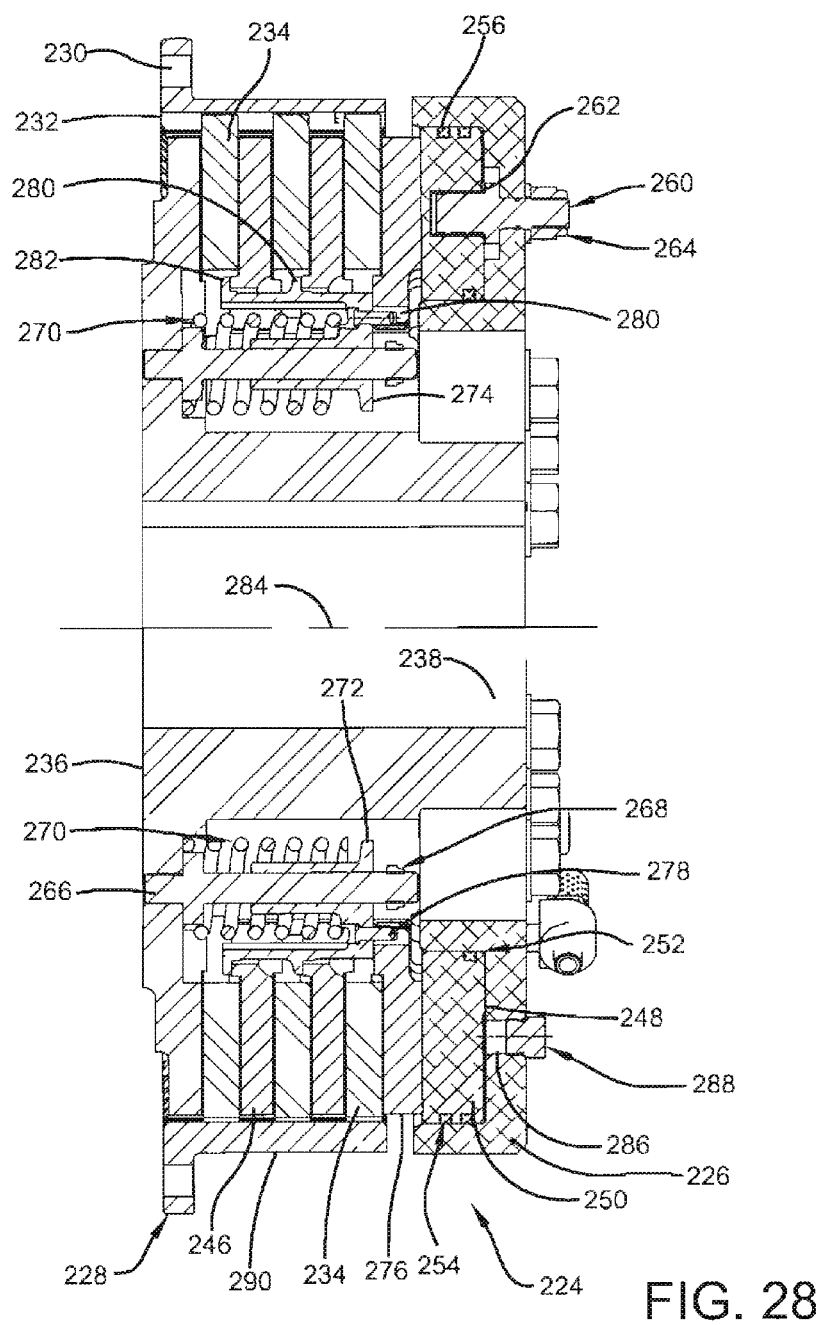
FIG. 28 is a cross-sectional view of the air-cooled clutch taken along line 28-28 in FIG. 27.
Figure 29:
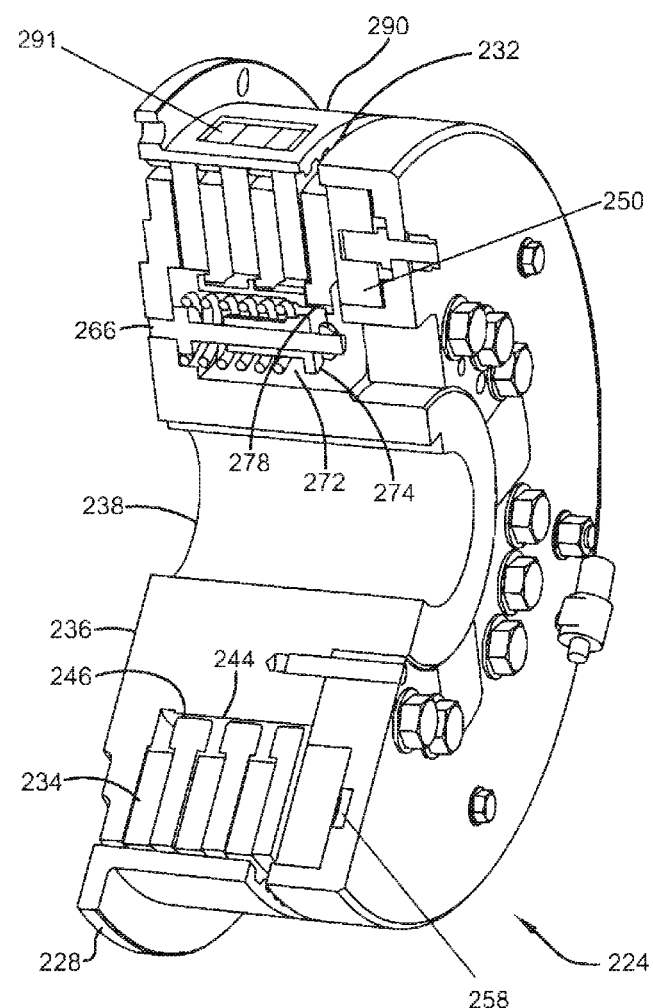
FIG. 29 is a sectional view taken along line 29-29 in FIG. 27.

FIGS. 27-29 show yet another exemplary embodiment of a clutch 224. Clutch 224 is configured to be actuated through the application of compressed air rather than liquid hydraulic fluid, however the principles may be applied to clutches actuated in either manner. Further the exemplary clutch 224 is configured to provide enhanced air cooling as well as other features that enable the clutch to be advantageously used in many different types of power transmission applications.

Clutch 224 includes a housing 226. Housing 226 is a generally cylindrical housing. The housing includes a drive ring 228. Drive ring 228 includes a plurality of openings 230 configured for extending fasteners therethrough. The drive ring may be connected in fixed operative engagement with a driver member such as a rotating member connected to an engine or to a driven member such as a pump, generator or other structure so as to selectively transmit rotational energy thereto.

The drive ring of the clutch housing further includes a splined annular surface 232. Splined surface 232 has a toothed configuration so as to matingly engage with the toothed annular outer circumference configuration of friction clutch discs 234. The splined annular surface 232 includes a plurality of radially inward facing outer splines that are elongated and enable the clutch discs to axially move in engagement therewith. Clutch 224 further includes a hub portion 236. Hub portion 236 includes a bore 238 that in an exemplary embodiment is configured to receive a shaft therethrough. The shaft, hub and housing are rotatable about an axis 284.

Hub 236 includes four splined angularly spaced arcuate segments 240. The arcuate segments extend between air containing openings 242. The arcuate segments have axially splined toothed surfaces 244. The toothed surfaces have radially outwardly directed inner splines that are configured to engage the inside annular toothed surface of separator discs 246. Each of the clutch discs 234 have an inner surface that is disposed radially outward from the inner splines, and each of the separator discs 246 have an outer surface that is disposed radially inward from the outer splines. As can be appreciated, the friction clutch discs 234 and the separator discs 246 comprise a disc pack and are enabled to relatively move axially within the housing. The clutch discs move with their toothed circumferential outside surfaces in conforming engagement with outer splines on splined surface 232 while the separator discs 246 move with their circumferential toothed surfaces at the inner surfaces in engagement with the inner splines 244 included in arcuate segments 240.

The housing 226 includes an annular piston cavity 248. An annular piston 250 is configured to be movable axially in the piston cavity 248. Resilient seals 252, 254 provide fluid tight movable engagement between the opposed surfaces of the piston and the walls bounding the piston cavity 248. In the exemplary arrangement the seals 252 and 254 are X-shape seals which provide a multi-point sealing engagement arrangement to minimize air loss around the seals and to help assure that the piston supplies the desired level of force when axially compressing the clutch discs and separator discs which make up the disc pack. Further in the exemplary arrangement a wiper seal 256 operatively extends between the wall of the piston cavity and the piston at the radially outward side of the piston. Wiper seal 256 of the exemplary arrangement serves to reduce the infiltration of debris and other material into the area between the piston cavity and the piston. The wiper seal 256 also helps to avoid debris reaching the inboard seal 254, which debris or other material may wear or otherwise render seal 254 less effective.

The exemplary piston cavity at its enclosed end is in operative connection with a fluid passage 258. Fluid passage 258 may be selectively operatively connected with a source of compressed air, which when pressure is applied, operates to urge the piston 250 to move to the left as shown in FIGS. 28 and 29.

In the exemplary arrangement, the plurality of angularly spaced anti-rotation guide pins 260 extend into the piston cavity and into recesses 262 in piston 250. Pins 260 are held in place by lock nuts 264 or similar structures. The interior cylindrical portions of pins 260 are sized so as to be movable within recesses which are also referred to as guide slots 262 that extend in the piston. As a result, the piston 250 is movable in an axial direction relative to guide pins 260 but is prevented from rotationally relatively moving with respect to the hub portion by the pins 260. This helps to assure transmission of rotational movement. Of course it should be understood that this approach is exemplary and in other arrangements, other approaches may be used.

Guide pins 266 extend axially in engagement with the hub portion in the area of each of the air containing openings 242. Each of the guide pins includes an engageable top portion 268. Top portion 268 includes a hex head or similar suitably configured portion so as to enable the guide pins to be rotated via a tool into threaded or similar fixed engagement with the hub portion. Compression springs 270 extend in surrounding relation of each guide pin 266. Springs 270 operate to bias spacers 272 to the right as shown in FIGS. 28 and 29. Each of spacers 272 include a forward face 274. The forward face biasingly engages the pressure plate 276 and biases the pressure plate and the piston in an axial direction toward the piston cavity. Pressure plate 276 is an annular pressure plate that extends axially intermediate of the piston 250 and a first of the clutch discs 234 in closest proximity to the piston as shown. Projections 278 extend axially outward from each of the spacers and are axially movably engaged in a respective one of recesses 280 which extend in the pressure plate, so as to maintain the rotational positioned alignment of the pressure plate therewith.

In the exemplary embodiment each of the spacers 272 further includes in cross section radially extending fingers 280,282. Fingers 280 and 282 are configured to engage respective separator discs 246 in the areas of the openings. Fingers 280 and 282 bias the separator discs axially in a direction toward the piston and piston cavity. Because the separator discs are biased by the spacers 272 in the four locations of the openings, the separator discs and the pressure plate 276 are generally uniformly axially biased by the springs toward the piston 250.

In operation of an exemplary embodiment, a rotational driver or driven device is operatively engaged with the drive ring 228. For purposes of this example, the operation of the clutch will be described with a driver such as a rotating member attached to an engine in operative connection with the drive ring. The drive ring is rotated by the engine which causes the area of the housing 226 in operative connection with the drive ring and the spline surface 232 to rotate in fixed direct operative connection therewith.

Rotation of the spline surface 232 causes the friction clutch discs 234 to rotate therewith. The shaft or other driven member that extends in the bore 238 of the hub portion in this example is a driven member in fixed direct operative connection with the driven device. The drive shaft extends along an axis 284 through the hub portion. When air pressure is not applied to the piston cavity, the piston 250 is retracted in the axial direction within the cavity due to the biasing force applied by springs 270 which act on the piston through the spacers 272 which bias the pressure plate 276. Spacers 272 through the fingers 280 and 282 also bias the separator discs 246 toward the pressure plate and the piston. The biasing of the separator discs in the axial direction also causes the clutch discs 234 to be moved in the axial direction.

With compressed air pressure not acting on the piston, forces acting between the clutch discs 234 and the separator discs 236 enable the discs to rotationally move relative to one another. As a result the rotation of the drive ring 230 does not cause the hub portion 236 to rotate. As a result, the shaft or other driven member that extends through the bore 238 of the hub portion is not caused to rotate.

Applying air pressure to the fluid passage 258 causes the piston 250 to move axially to the left as shown in FIGS. 28 and 29. Movement of the piston overcomes the relatively smaller biasing force of the springs 270 and causes the pressure plate 276 to move in the axial direction to the left as shown. Movement of the pressure plate causes the clutch discs and separator discs to be in axially compressed engagement. The compression of the discs in the disc pack causes the discs to be firmly engaged. As a result the driving force applied to the drive ring 230 is effectively transferred through the disc pack to the hub portion 236 which rotates in engagement therewith. This causes the shaft or other member which extends in the bore to also rotate in coordinated relation with the drive ring.

Removing the fluid pressure from the passage 238 leading to the piston cavity releases the force previously applied by the piston 250 to compress the discs. The pressure plate 276 and the friction discs and separator discs 234 and 246 are again moved by the force of the springs so that the discs are no longer in compressed engagement. The force of springs 270 acts through the spacers 272. As a result the clutch discs and separator discs again become relatively rotationally movable and the clutch is disengaged.

The exemplary configuration of the clutch 224 includes a plurality of angularly spaced threaded bores 286. Bores 286 which serve as actuator openings extend from outside of the housing and into the piston cavity 248. Threaded bores 286 are generally fluidly closed by plugs 288 that are at least partially threaded therein. In the exemplary embodiment if conditions arise where it is not possible to supply air pressure to actuate the clutch, the plugs 288 may be removed from the bores 286. Threaded bolts or other pins or similar members may be threaded into the bores 286 so as to engage the back of the annular piston 250. The annular piston 250 may be moved by such members being threaded in the bores so as to axially move the piston in a manner similar to that caused by air pressure so as to engage the clutch. This enables the driving and driven members to be solidly engaged even in situations where the clutch could not be engaged in the normal manner. This approach is highly useful in emergency situations where the clutch can be engaged on a manual basis. Further the solid piston construction of the exemplary arrangement enables the use of this emergency technique for purposes of actuating the clutch.

In some exemplary arrangements to provide additional cooling of the clutch discs, the annular area 290 of the housing that is connected to the drive ring and the spline surface 232 may include one or more slotted openings 291. The slotted air containing openings may extend in the circumferential direction circumferentially across the splines of surface 232. Alternatively or in addition the air containing openings may extend in a direction parallel to the axis. In some arrangements such opening may span more than one clutch disc. The openings may provide passages for air flow through the clutch to facilitate the cooling of the discs. In addition such openings may also provide a means for debris and other material that is generated by the action of the clutch to escape from the interior of the housing. This may facilitate the reliable operation of the clutch under high temperature and other extreme operating conditions. Further in some exemplary arrangements provisions may be made for air containing passages or other suitable grooving arrangements through the discs or other surfaces to help facilitate cooling in the areas of the friction and separator discs. In other exemplary arrangements fins may be utilized to establish greater air movement through the air containing spaces. Of course the approaches used can be varied depending on the operating environment in which the clutch is utilized.

Figure 30:
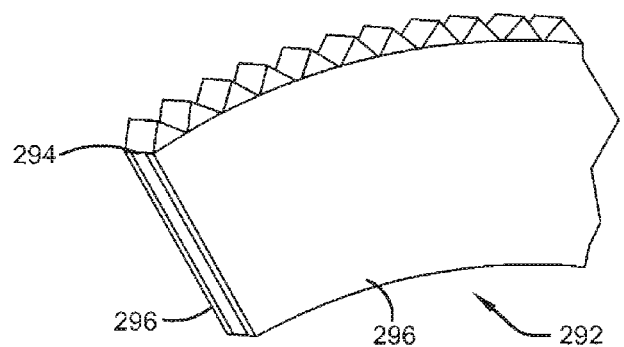
FIG. 30 is an isometric view of a segment of an exemplary molded composite clutch disc of an exemplary embodiment suitable for use in connection with the clutch shown in FIG. 27.
Figure 31:
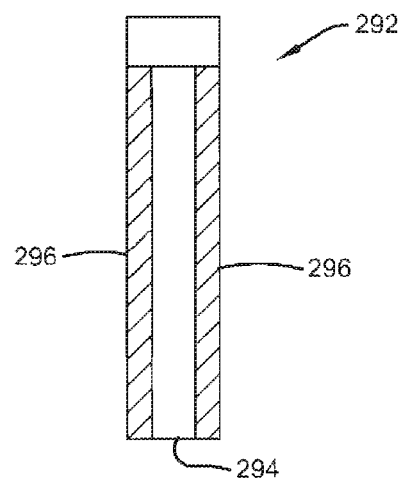
FIG. 31 is a cross-sectional view of the composite clutch disc shown in FIG. 30.

In some exemplary embodiments of the clutch 224, clutch discs of the type shown in FIGS. 30 and 31 may be used. Clutch discs 292 are of a unitary molded composite construction which is comprised of two different materials. A core portion 294 is comprised of a fiber reinforced polymer material. Core 294 includes the central disc portion as well as the teeth of the toothed outer annular portion engage an annular splined surface such as spline surface 232 of clutch 224. In exemplary embodiments the core 294 may be comprised of carbon or glass fiber reinforced polymers which provide for a rigid, strong and lightweight torque transmitting structure for the disc.

The exemplary clutch disc 292 further includes a pair of annular opposed molded friction surfaces 296. Friction surfaces 296 are comprised of molded high friction material which includes suitable carbon fibers or other types of materials that provide high friction engagement between the friction surfaces and the adjacent separator discs. In the exemplary embodiment the clutch discs 292 may be manufactured via pressurized molding operations that cause the constituents which make up the core and friction surfaces be bound together in a strong unitary disc structure that is able to withstand high temperatures, pressures and the rotational forces which are encountered in a clutch disc environment. Further a useful aspect of the exemplary clutch disc structure is that it may be dimensioned so as to be a direct replacement for other types of clutch discs that are made of separately assembled support and friction elements. Of course it should be understood that these features are exemplary and in other embodiments other approaches may be used.

Although arrangements have been described based upon certain exemplary embodiments, a wide array of modifications, variations and alternative constructions are also within the spirit and scope of the principles described herein. Example arrangements for mechanical clutches and other related power transmission systems have been described herein with reference to particular components, features, properties, attributes, relationships and methods. However, it should be understood that in other embodiments other arrangements may include other components, features, properties, attributes, relationships and/or methods which provide similar capabilities and functionalities.

It will be readily understood that the features of exemplary embodiments as generally described and illustrated in the Figures can be arranged and designed in a wide array of different configurations. That is, features, structures and/or characteristics of embodiments or arrangements described herein may be combined in any suitable manner in one or other embodiments or arrangements. Thus the detailed description of the exemplary embodiments of apparatus, methods and articles as represented in the Figures is not intended to limit the scope of the embodiments as claimed, but is merely representative of selected exemplary embodiments that implement the principles described herein.

In the foregoing description certain terms have been used to describe example arrangements for purposes of brevity, clarity and understanding. For example certain terms such as "upward", "downward", "higher", "lower", "left", "right", "outer", "inner", "front", "rear", "top", and "bottom" may have been used. However, no unnecessary limitations are to be implied therefrom because such terms have been used for descriptive purposes and are intended to be broadly construed. The terms shall not be construed as limitations on the scope of the claims hereof. Moreover, the descriptions and illustrations herein are by way of examples and the inventive teachings are not limited to the specific details that have been shown and described.

The exemplary structures and arrangements along with the methods of preparing and using such structures and arrangements achieves at least one of the above stated objectives, eliminates difficulties encountered in the use of prior devices and systems, solves problems and attains the desirable results described herein.

In the following claims, any feature described as a means for performing a function shall be construed as encompassing any means capable of performing the recited function and shall not be deemed to be limited to the particular means used for performing the function in the foregoing description or mere equivalents thereof.

Having described the features, discoveries and principles of the exemplary embodiments, the manner in which they are constructed and operated and the advantages and useful results attained, the new and useful structures, devices, elements, arrangements, parts, combinations, systems, equipment, operations, methods, processes and relationships are set forth in the appended claims.

We claim:
1. Apparatus comprising:
a clutch configured to operatively engage a driver device and a driven device in selective slipping engagement, including,
a coupling, wherein the coupling is configured to be in fixed operative connection with one of the driver device and the driven device,
a shaft, wherein the shaft is configured to be in fixed operative connection with the other of the driver device and the driven device,
a disc housing, wherein the disc housing is in fixed operative rotational connection with the coupling,
a hub, wherein the hub extends in concentric relation and radially inward of the disc housing, wherein the hub is in fixed operative rotational connection with the shaft, wherein the hub and disc housing are relatively rotationally movable,
a disc pack, including:
at least two spaced clutch discs, wherein each clutch disc is in operatively engaged rotational connection with one of the disc housing and the hub, and wherein each clutch disc is relatively axially movable with respect to the disc housing and the hub,
at least one separator disc, wherein each separator disc is intermediate of an adjacent pair of clutch discs, wherein each separator disc is in operatively engaged rotational connection with the other of the disc housing and the hub, and wherein each separator disc is relatively axially movable with respect to the disc housing and the hub,
an annular piston, wherein the piston is selectively axially movable responsive to fluid pressure, and wherein the annular piston is in operative connection with the disc pack,
a liquid manifold, wherein the manifold is disposed radially inward of the disc pack, wherein the manifold is configured to deliver a liquid that is movable radially outward between the at least two clutch discs and the at least one separator disc,
wherein selective axial movement of the piston between a plurality of slip positions in which the at least two clutch discs and at least one separator disc are in axially noncontacting relation, is operative to cause fluid shear force of the liquid between the discs of the disc pack to cause the disc pack to selectively partially transmit input rotational movement from the driver device at a first rotational speed to the driven device, wherein the driven device is driven at a selectively variable second speed lower than the first speed,
and wherein selective axial movement of the piston to at least one engaged position is operative to cause the at least two clutch discs and at least one separator disc to be in axially contacting compressed, nonslip engagement, wherein the driven device is driven at the first rotational speed.
2. The apparatus according to claim 1
wherein the hub includes a spline portion, wherein the spline portion includes a plurality of angularly spaced axially extending grooves,
wherein a plurality of fluid openings extend between the grooves of the spline portion, wherein liquid from the manifold is enabled to pass outwardly through the plurality of fluid openings.
3. The apparatus according to claim 1
wherein the shaft includes an actuator fluid passage, wherein the actuator fluid passage is in fluid connection with the annular piston, wherein the piston is moved responsive to fluid pressure in the actuator fluid passage,
and further including
a first sensor, wherein the first sensor is operative to sense data corresponding to rotational speed of the first rotating component of the clutch, wherein the speed of the first rotating component corresponds to speed of the coupling,
a second sensor, wherein the second sensor is operative to sense data corresponding to rotational speed of a second rotating component of the clutch, wherein rotational speed of the second rotating component corresponds to speed of the shaft,
a fluid pressure control valve, wherein the fluid pressure control valve is in operative fluid connection with the actuator fluid passage,
clutch control circuitry, wherein the clutch control circuitry is in operative connection with the first sensor, the second sensor and the fluid pressure control valve,
wherein the clutch control circuitry is operative to control the relative rotational speed of the shaft relative to the coupling through varied fluid pressure delivered by the fluid pressure control valve to the actuator fluid passage.
4. The apparatus according to claim 1
wherein the shaft further includes a transmission fluid passage, wherein the transmission fluid passage is in fluid connection with the liquid manifold,
at least one temperature sensor, wherein the at least one temperature sensor is operative to sense temperature of at least one item corresponding to temperature of the clutch,
at least one transmission fluid handling component in operative fluid connection with the transmission fluid passage, wherein the at least one fluid handling component includes at least one of a transmission fluid flow control valve, a pump and a heat exchanger,
clutch control circuitry, wherein the clutch control circuitry is in operative connection with the at least one temperature sensor and the at least one transmission fluid handling component,
wherein the clutch control circuitry is operative to control at least one of transmission fluid flow rate and transmission fluid temperature responsive at least in part to temperature sensed by the at least one temperature sensor.
5. Apparatus comprising:
a clutch configured to operatively engage a driver device and a driven device in selective slipping engagement, including,
a coupling, wherein the coupling is configured to be in fixed operative connection with one of the driver device and the driven device,
a shaft, wherein the shaft is configured to be in fixed operative connection with the other of the driver device and the driven device,
a disc housing, wherein the disc housing is in fixed operative rotational connection with the coupling,
a hub, wherein the hub extends in concentric relation and radially inward of the disc housing, wherein the hub is in fixed operative rotational connection with the shaft, wherein the hub and disc housing are relatively rotationally movable,
a disc pack, including:
at least two spaced clutch discs, wherein each clutch disc is in operatively engaged rotational connection with one of the disc housing and the hub, and wherein each clutch disc is relatively axially movable with respect to the disc housing and the hub, at least one separator disc, wherein each separator disc is intermediate of an adjacent pair of clutch discs, wherein each separator disc is in operatively engaged rotational connection with the other of the disc housing and the hub, and wherein each separator disc is relatively axially movable with respect to the disc housing and the hub, an annular piston, wherein the piston is selectively axially movable responsive to fluid pressure, and wherein the annular piston is in operative connection with the disc pack, a liquid manifold, wherein the manifold is disposed radially inward of the disc pack, wherein the manifold is configured to deliver a fluid shear force transmitting liquid, which liquid extends between the at least two clutch discs and the at least one separator disc, wherein selective axial movement of the piston between a plurality of slip positions in which at least two of the at least two clutch discs and at least one separator disc are disposed at varied distances in axially noncontacting relation, is operative to cause the fluid shear force transmitting liquid to transmit fluid shear force between the discs of the disc pack and cause the disc pack to selectively partially transmit input rotational movement from the driver device at a first rotational speed to the driven device, wherein the driven device is driven at a selectively variable second speed lower than the first speed, and wherein selective axial movement of the piston to at least one engaged position is operative to cause the at least two clutch discs and at least one separator disc to be in axially contacting compressed, nonslip engagement, wherein the driven device is driven at the first rotational speed.

6. The apparatus according to claim 5
wherein each of the clutch discs include friction material thereon, and wherein the friction material includes grooves holding fluid shear force transmitting liquid.

7. Apparatus comprising:
a clutch configured to operatively engage a driver device and a driven device in selective slipping engagement, including,
a coupling, wherein the coupling is configured to be in fixed operative connection with one of the driver device and the driven device,
a shaft, wherein the shaft is configured to be in fixed operative connection with the other of the driver device and the driven device,
a disc housing, wherein the disc housing is in fixed operative rotational connection with the coupling,
a hub, wherein the hub
 extends in concentric relation and radially inward of the disc housing,
 is in fixed operative rotational connection with the shaft, and the hub and disc housing are relatively rotationally movable,
 includes a spline portion including a plurality of angularly spaced axially extending grooves, wherein a plurality of fluid openings extend between the grooves,
a disc pack, including:
 at least two spaced clutch discs, wherein each clutch disc is in operatively engaged rotational connection with one of the disc housing and the hub, and wherein each clutch disc is relatively axially movable with respect to the disc housing and the hub,
 at least two separator discs, wherein each separator disc is intermediate of an adjacent pair of clutch discs, wherein each separator disc is in operatively engaged rotational connection with the other of the disc housing and the hub, and wherein each separator disc is relatively axially movable with respect to the disc housing and the hub,
a Belleville spring, wherein the Belleville spring
 is positioned axially between immediately adjacent separator discs,
 includes a serrated inner diameter including a plurality of inner projections and inner recesses,
 wherein each of the inner projections is configured to extend in a respective groove of the spline portion of the hub,
an annular piston, wherein the piston is selectively axially movable responsive to fluid pressure, and wherein the annular piston is in operative connection with the disc pack,
a liquid manifold, wherein the manifold is disposed radially inward of the disc pack, wherein the manifold is configured to deliver a liquid through the plurality of fluid openings that is movable radially outward between the at least two clutch discs and the at least two separator discs,
wherein selective axial movement of the piston between a plurality of slip positions in which the at least two clutch discs and at least two separator discs are in axially noncontacting relation, is operative to cause fluid shear force between the discs of the disc pack to cause the disc pack to selectively partially transmit input rotational movement from the driver device at a first rotational speed to the driven device, wherein the driven device is driven at a selectively variable second speed lower than the first speed,
and wherein selective axial movement of the piston to at least one engaged position is operative to cause the at least two clutch discs and at least one separator disc to be in axially contacting compressed, nonslip engagement, wherein the driven device is driven at the first rotational speed.

8. The apparatus according to claim 7
wherein the Belleville spring includes a serrated outer diameter, wherein the serrated outer diameter includes a plurality of outer projections and outer recesses,
wherein radially outward moving liquid is enabled to move past the serrated outer diameter and serrated inner diameter.

9. The apparatus according to claim 8
wherein the disc pack includes at least three separator discs and at least two Belleville springs,
wherein each Belleville spring is configured to include in cross section, a contour angled radially outward in one direction,
wherein the Belleville springs on opposed immediately adjacent sides of each separator disc are configured to extend in opposite angled directions.

10. The apparatus according to claim 9
wherein each clutch disc includes a metal clutch disc portion and annular friction material extending from each axial side of the clutch disc,
wherein the annular friction material includes liquid holding grooves.

11. The apparatus according to claim 10
wherein the grooves in the friction material include radially extending grooves.
12. The apparatus according to claim 10
wherein the grooves and the friction material include circumferentially extending grooves.
13. The apparatus according to claim 10
wherein each of the separator discs includes an inner splined diameter, wherein the inner splined diameter is configured to matingly axially movably engage the splined portion of the hub.
14. The apparatus according to claim 13
wherein the disc housing includes an annular inward splined surface,
wherein each of the clutch disc portions includes an outer splined diameter, wherein the outer splined diameter is configured to axially movably matingly engage the inward splined surface.
15. The apparatus according to claim 14
wherein the disc housing includes at least one fluid outlet opening, wherein liquid that has moved outwardly through the disc pack is enabled to leave the disc housing through the at least one fluid outlet opening,
a clutch housing, wherein the clutch housing extends in generally surrounding relation of the disc housing, wherein liquid moved through the at least one fluid outlet opening is contained within the disc housing.
16. The apparatus according to claim 15
and further including at least one gear, wherein the at least one gear is movable within the clutch housing,
wherein the at least one gear is in fixed operative connection with one of the coupling and the shaft,
a plurality of accessory openings in the clutch housing, wherein the at least one gear is accessible through each of the at least one accessory openings,
a plurality of removable covers, wherein each respective removable cover is configured to close a respective one of the accessory openings.
17. The apparatus according to claim 15
wherein the annular piston is movable in an annular piston cavity,
wherein the shaft includes an actuator fluid passage, wherein the actuator fluid passage is in fluid connection with the piston cavity, wherein the piston is moved responsive to fluid pressure in the actuator fluid passage.
18. The apparatus according to claim 17
wherein the shaft further includes a transmission fluid passage,
wherein the manifold is in fluid connection with the transmission fluid passage.
19. The apparatus according to claim 18
and further including
a first sensor, wherein the first sensor is operative to sense data corresponding to rotational speed of the first rotating component of the clutch, wherein the speed of the first rotating component corresponds to speed of the coupling,
a second sensor, wherein the second sensor is operative to sense data corresponding to rotational speed of a second rotating component of the clutch, wherein rotational speed of the second rotating component corresponds to speed of the shaft,
a fluid pressure control valve, wherein the fluid pressure control valve is in operative fluid connection with the actuator fluid passage,
clutch control circuitry, wherein the clutch control circuitry is in operative connection with the first sensor, the second sensor and the fluid pressure control valve,
wherein the clutch control circuitry is operative to control the relative rotational speed of the shaft relative to the coupling through varied fluid pressure delivered by the fluid pressure control valve to the actuator fluid passage.
20. The apparatus according to claim 19 and further comprising:
a transmission fluid control valve, wherein the transmission fluid control valve is in fluid connection with the transmission fluid passage,
wherein the transmission fluid control valve is in operative connection with the clutch control circuitry,
wherein the clutch control circuitry is operative to control the flow rate of transmission fluid through the disc pack.
21. The apparatus according to claim 20 and further comprising:
at least one temperature sensor, wherein the at least one temperature sensor is operative to sense temperature of at least one item corresponding to temperature of the clutch,
wherein the at least one temperature sensor is in operative connection with the clutch control circuitry,
wherein the clutch control circuitry is operative to control flow rate of transmission fluid through the disc pack responsive at least in part to the temperature sensed by the at least one temperature sensor.

* * * * *